(12) United States Patent
Sovine et al.

(10) Patent No.: US 7,789,666 B2
(45) Date of Patent: Sep. 7, 2010

(54) TRAINING DOOR

(75) Inventors: Addison Sovine, Orem, UT (US); Kyle Bateman, Provo, UT (US); David Bassett, Provo, UT (US); James Sovine, Orem, UT (US); Tom Wright, Highland, UT (US); Thomas Marshall, Provo, UT (US)

(73) Assignee: Action Target Inc., Provo, UT (US)

( * ) Notice: Subject to any disclaimer, the term of this patent is extended or adjusted under 35 U.S.C. 154(b) by 1159 days.

(21) Appl. No.: 11/321,738

(22) Filed: Dec. 29, 2005

(65) Prior Publication Data

US 2006/0240391 A1    Oct. 26, 2006

Related U.S. Application Data

(60) Provisional application No. 60/640,484, filed on Dec. 30, 2004, provisional application No. 60/651,587, filed on Feb. 10, 2005.

(51) Int. Cl.
   *G09B 19/00* (2006.01)
(52) U.S. Cl. .................................................. 434/226
(58) Field of Classification Search ................... 434/11, 434/16, 219, 226, 247; 52/98, 204.1, 205, 52/213
   See application file for complete search history.

(56) References Cited

U.S. PATENT DOCUMENTS

| 5,163,689 | A |   | 11/1992 | Bateman et al. |   |
|---|---|---|---|---|---|
| 5,400,692 | A |   | 3/1995 | Bateman et al. |   |
| 5,433,451 | A |   | 7/1995 | De Vries |   |
| 5,535,662 | A |   | 7/1996 | Bateman et al. |   |
| 5,752,835 | A | * | 5/1998 | Whitmer, Sr. | 434/226 |
| 5,811,718 | A |   | 9/1998 | Bateman et al. |   |
| 5,822,936 | A |   | 10/1998 | Bateman et al. |   |
| 5,906,493 | A | * | 5/1999 | Bishop | 434/226 |
| 6,179,620 | B1 | * | 1/2001 | Schmid | 434/226 |
| 6,311,980 | B1 |   | 11/2001 | Sovine et al. |   |
| 6,378,870 | B1 |   | 4/2002 | Sovine et al. |   |
| 6,484,990 | B1 |   | 11/2002 | Marshall et al. |   |
| 6,533,280 | B1 |   | 3/2003 | Sovine et al. |   |
| 6,588,759 | B1 |   | 7/2003 | Bateman et al. |   |
| 6,776,418 | B1 |   | 8/2004 | Sovine et al. |   |
| 6,808,178 | B1 |   | 10/2004 | Sovine et al. |   |
| 6,877,988 | B2 | * | 4/2005 | Phillips et al. | 434/226 |
| 6,975,859 | B1 |   | 12/2005 | Lambert et al. |   |
| 6,994,348 | B2 |   | 2/2006 | Lambert et al. |   |
| 6,994,349 | B2 |   | 2/2006 | Lambert et al. |   |
| 7,074,043 | B1 | * | 7/2006 | Jacobson | 434/226 |
| 7,140,615 | B1 |   | 11/2006 | Sovine et al. |   |
| 7,175,181 | B1 |   | 2/2007 | Bateman et al. |   |

(Continued)

OTHER PUBLICATIONS www.letargets.com. Breach training door. Circa 2005.

(Continued)

*Primary Examiner*—Kurt Fernstrom
(74) *Attorney, Agent, or Firm*—Bateman IP Law Group

(57) ABSTRACT

A reusable ballistic door for use in the training of individuals such as police officers and military personnel. The door may be formed to have different weak spots, requiring different techniques to enter the door. The door may be quickly and inexpensively rebuilt for subsequent training. A reusable training door may also be used inside of a shoot house to provide realistic training scenarios.

73 Claims, 45 Drawing Sheets

U.S. PATENT DOCUMENTS

| | | |
|---|---|---|
| 7,194,944 B2 | 3/2007 | Lambert et al. |
| 7,219,897 B2 | 5/2007 | Sovine et al. |
| 7,234,890 B1 | 6/2007 | Marshall et al. |
| 7,264,246 B2 | 9/2007 | Sovine et al. |
| 7,275,748 B2 | 10/2007 | Lambert et al. |
| 7,303,192 B2 | 12/2007 | Marshall et al. |
| 7,306,230 B2 | 12/2007 | Lambert et al. |
| 7,322,771 B1 | 1/2008 | Marshall et al. |
| 2005/0022658 A1 | 2/2005 | Bateman et al. |
| 2005/0050816 A1* | 3/2005 | Manning et al. ............... 52/213 |
| 2006/0234069 A1 | 10/2006 | Sovine et al. |
| 2006/0240388 A1 | 10/2006 | Marshall et al. |
| 2007/0040334 A1 | 2/2007 | Marshall et al. |
| 2007/0045965 A1 | 3/2007 | Bateman et al. |
| 2007/0069472 A1 | 3/2007 | Lambert et al. |
| 2007/0072537 A1 | 3/2007 | Bateman et al. |
| 2007/0102883 A1 | 5/2007 | Parks et al. |
| 2007/0114724 A1 | 5/2007 | Bassett et al. |
| 2007/0235943 A1 | 10/2007 | Bateman et al. |
| 2008/0022847 A1 | 1/2008 | Bateman et al. |

OTHER PUBLICATIONS www.mgmtargets.com. Breach training door. Circa 2005.

* cited by examiner

TRAINING DOOR

RELATED APPLICATIONS

The present application claims the benefit of U.S. Provisional Application No. 60/640,484, filed Dec. 30, 2004, expressly incorporated herein, and U.S. Provisional Application No. 60/651,587, filed Feb. 10, 2005, expressly incorporated herein.

BACKGROUND OF THE INVENTION

1. The Field of the Invention

The present invention relates to a door for use in shoot houses and ballistic training. More specifically, the present invention relates to a modular training door for forced entry which may be quickly and cost effectively replaced.

2. State of the Art

In conducting training for individuals such as police officers, military personnel, etc. it is desirable to duplicate the conditions which the individual will encounter while working. Thus, training should simulate job activities, with the goal of making the training as realistic as is practical.

It is desirable for individuals such as police officers and military personnel to participate in training scenarios such as entering buildings or rooms, or sweeping areas. In actual working scenarios, these tasks often involve breaking down doors. Therefore, it is ideal for training scenarios intended to simulate these working conditions to also involve breaking down doors.

Traditionally, a conventional door is installed into the training area, and the trainees enter the door and complete the exercise. The common methods for entering a closed or locked door include: kicking in the door, using a battering ram to break in the door, using a shotgun to blast away the door latch or hinges, and using explosives to blast through the door. Thus, the door is typically destroyed during the exercise.

Ordinary doors are somewhat expensive, typically up to a few hundred dollars depending on the type of door. Additionally, some time and work is required to install a new door after the previous door has been used.

The expenses in performing training where individuals break through doors are significant because the door is often destroyed during every training exercise. Where multiple doors may be used inside of a training building, there is considerable time and expense to replace all of the doors prior to the next training session.

A reusable training door has been made which is designed to be kicked or smashed open without destroying the door. The door is attached to a specialized door frame with a number of pegs having a star shaped cross section. The door is then opened by hitting or kicking the door with sufficient force to break the pegs. The specialized pegs are, however, fairly expensive, making the door less practical for repeated use. Additionally, the door may not be opened in a variety of methods commonly used, including shooting the door open or blasting the door open, without destroying the door.

Training doors, such as those discussed above, are not known in a shoot house. Training doors have been built to allow limited types of entry techniques to be practiced, such as forcing a door open, but the training doors known are simply placed in a doorjamb, placed vertical, braced to remain vertical when hit, and broken open. They are not used in combination with a larger training environment such as a shoot house. As such, the training doors have limited training benefit as the door is simply broken open, and is not used in the context of a training scenario.

There is thus a need for a door which is cheaper and easier to use than a conventional door in training individuals such as police and military personnel in breaking through doorways. There is also a need for a reusable door which is not destroyed during the training exercise, which uses inexpensive and readily available replacement parts if necessary, and which may be opened by a variety of methods commonly used by police and military personnel. There is also a need for a training door which may be mounted inside of a shoot house so as to provide a realistic environment in which to use the training door.

SUMMARY OF THE INVENTION

It is an object of the present invention to provide an improved door for use in training police officers, military personnel, and the like.

According to some aspects of the present invention, the door is reusable. Additionally, the door may be constructed to have some parts which are bullet proof and some parts which may be destroyed in training and replaced. A door may be constructed of steel plate and may use some destructible materials such as wood to allow for breaking through the door. Alternatively, the door may use a variety of catches which allow the door to open once sufficient force is applied.

According to other aspects of the invention, the door is easily repaired and placed for subsequent training. Where necessary, various parts of the door may be replaced after being broken during training. These parts of the door may be made from commonly available material such as wood, wire, plastic, etc.

According to other aspects of the present invention, the door or a replaceable portion thereof is inexpensive. A portion of the door may be constructed from steel and bullet proof steel plate, using conventional construction methods, making the door durable. Other portions of the door may be made from a relatively inexpensive and destructible material, such that small and inexpensive portions of the door are replaced after training exercises.

BRIEF DESCRIPTION OF THE DRAWINGS

Various embodiments of the present invention are shown and described in reference to the numbered drawings wherein.

It will be appreciated that the drawings are illustrative and not limiting of the invention, and that the various embodiments shown accomplish various aspects and objects of the invention.

DETAILED DESCRIPTION

The drawings will now be discussed in reference to the numerals provided therein so as to enable one skilled in the art to practice the present invention. The drawings and descriptions are exemplary of various aspects of the invention and are not intended to narrow the scope of the appended claims.

Figure 1:
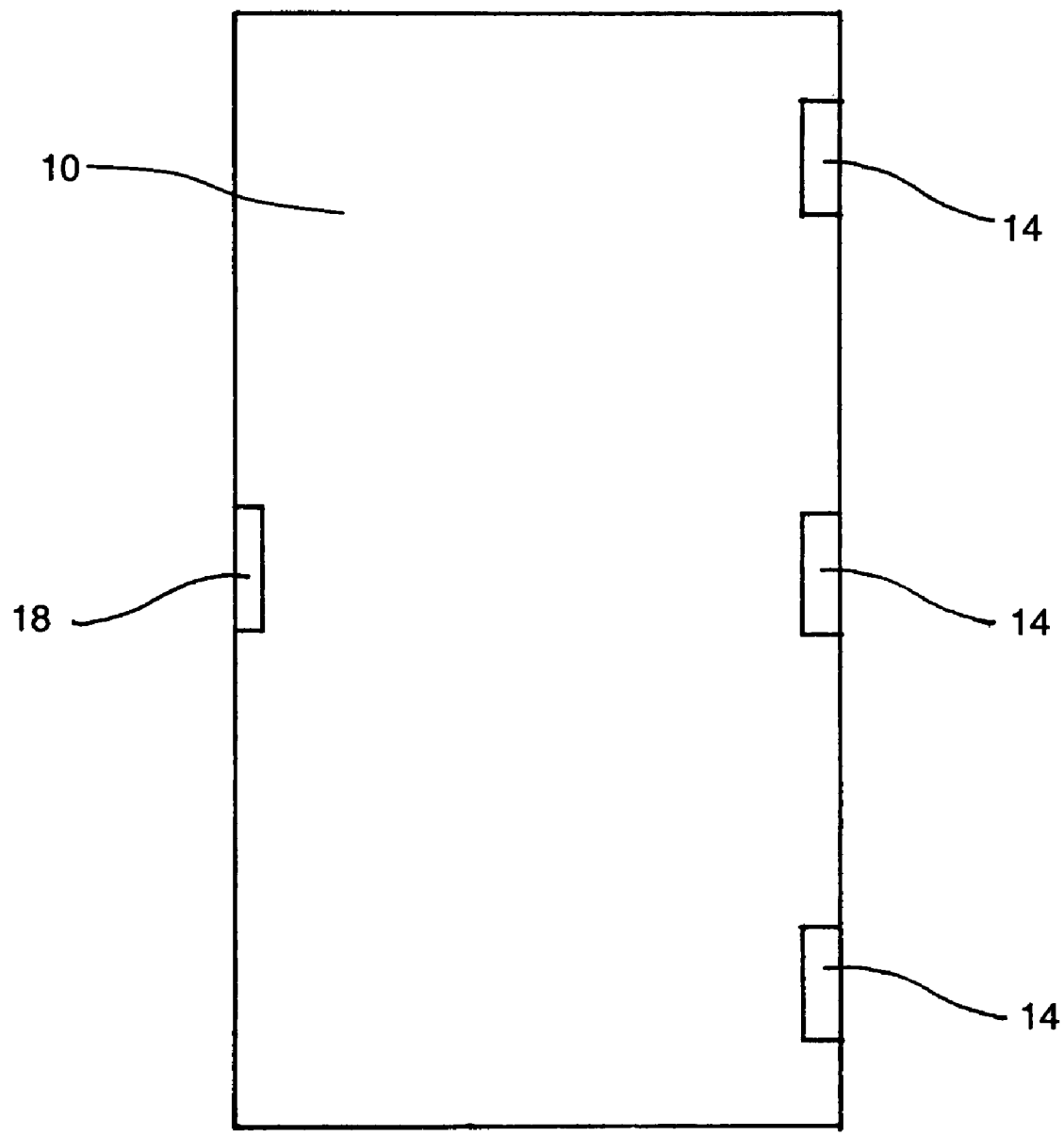
FIG. 1 shows a door according to aspects of to the present invention.

Turning to FIG. 1, a door according to aspects of the present invention is shown. The door 10 is constructed from a piece of plate steel, and is formed with a number of hinges 14 and a bracket 18, which simulates the door latch.

Typically, the door 10 will be mounted in a bullet proof training environment, such as a shoot house, which has been designed for the appropriate training scenario. Typically, these scenarios include raiding a building or room, clearing areas of hidden dangers or enemies, a drug bust, etc.

The shoot house will thus have a location for mounting the door 10, including a place to mount hinges and a bracket which correspond to the hinges 14 and bracket 18 on the door. It will be appreciated that the door will be used in an environment which includes bullets, small explosives, and the use of force. Accordingly, the door 10 and associated hinges 14 and bracket 18 are preferably constructed so as to be both durable and bullet resistant.

The specific design of the door hinges 14 and bracket 18 will depend upon the desired method of opening the door for a specific training scenario. Where an all steel construction is used for a particular structure, the structure will be generally impervious to bullets, explosives, and force. Thus, certain parts of the door 10 are preferably made to be breakable. The door of FIG. 1 may be formed with any or all of the devices shown in the remaining figures and should be read as such.

In discussing the present invention, it will be appreciated that the various aspects and subassemblies (such as hinges, catches, openings, etc.) shown in the drawings may be combined in an almost endless number of possibilities to form a desired training door. It will be appreciated that it is thus not possible to discuss every possible training door which may be formed according to the present invention in a concise manner. Thus, the invention is discussed by presenting a number of different types of training doors or door styles, and also by presenting details of the various hinge styles, door catches or latch mechanisms, destructible portions of the door, etc. The various subassemblies and mechanisms of the doors are discussed separately to allow for greater detail in the discussion thereof. Thus, the discussion of each style or type of door should be read as including the various hinge designs, catch mechanisms, etc. which are shown and described separately.

Figure 2:
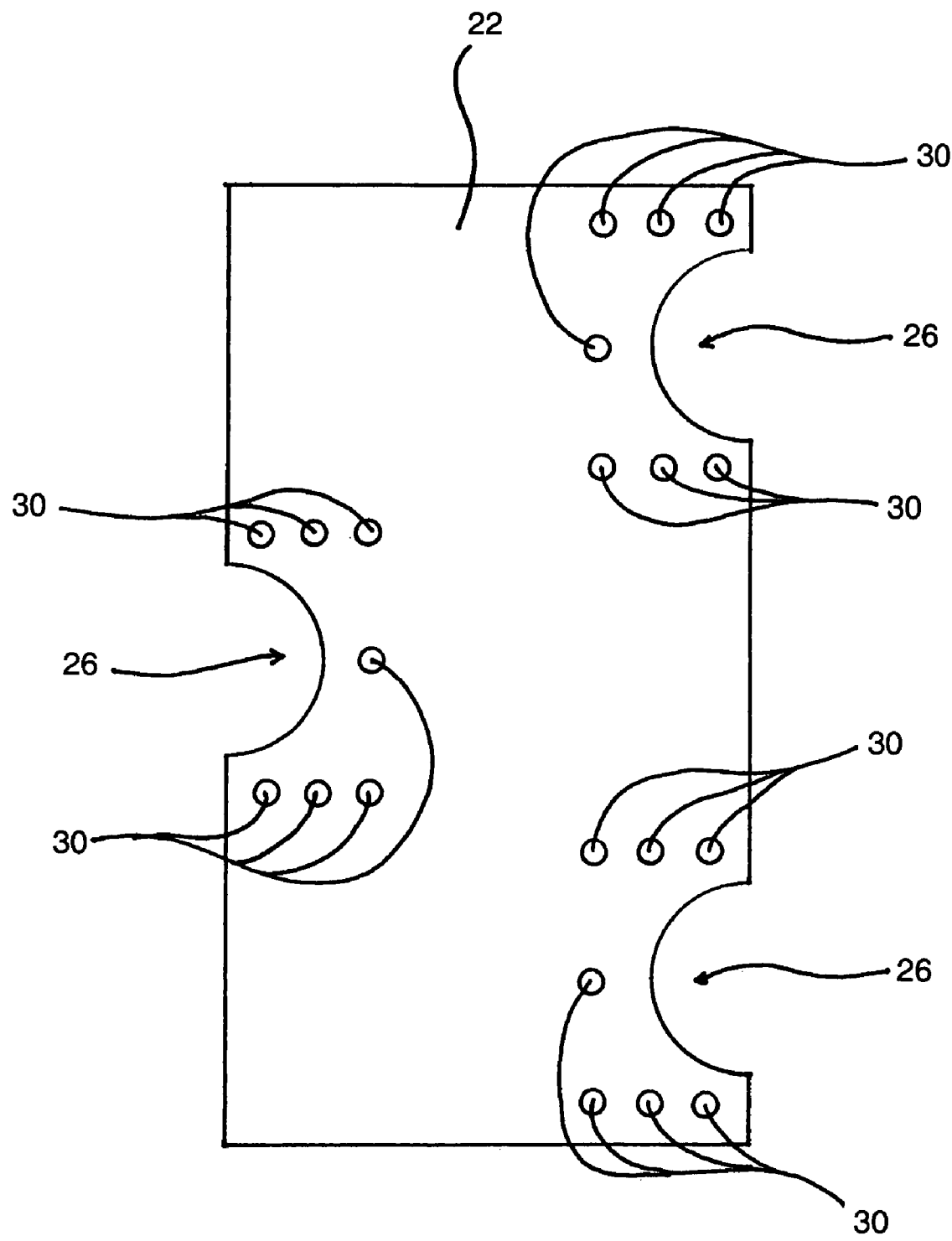
FIG. 2 shows another door according to aspects of the present invention.

Turning to FIG. 2, another door 22 according to the present invention is shown. The door 22 is shown with cutout portions 26 in the place of hinges or a closing latch or bracket. The cutout portions 26 may be surrounded by a number of holes 30. Holes 30 may be used for attaching a piece of a destructible material, such as wood, sheetrock, acoustic tile, ceiling tile, foam, plastic, or the like over the cutout portion 26. Typically, nuts and bolts may be used to attach the destructible material to the door. Alternatively, threaded studs may be attached to the door 22, screws may pass through the holes 30 and inserted into the destructible material, or other fasteners may be used. A hinge or bracket may then be attached to the destructible material. This allows a trainee to break or shoot through the material to open the door. It will be appreciated that destructible as used herein means that the material may be broken, damaged, or otherwise consumed in response to kicking, battering, shooting, or the use of explosives. Additionally, it will be appreciated that a large number of materials may be used, with varying sizes of material used to provide varying resistance to breaking the material and opening the door. Materials are typically selected by their mechanical properties such as breaking, their cost, and their ease of replacement.

It will be appreciated that not all of the hinges or brackets need be attached to a piece of destructible material. Thus, a door may be constructed with a generally bullet proof bracket (simulating the door latch) and hinges which are attached to destructible material. This simulates a door with a bullet proof plate covering the latch but with unprotected hinges. Additionally, the bracket may be attached to the destructible material and the hinges made generally bullet proof, simulating a door which may be entered by breaking or shooting the latch.

It will be appreciated that the door design shown may be used with any or all of the hinge, catch, and other mechanisms shown, and that the remaining figures show features which may be regarded as part of the door of FIG. 2.

Figure 3:
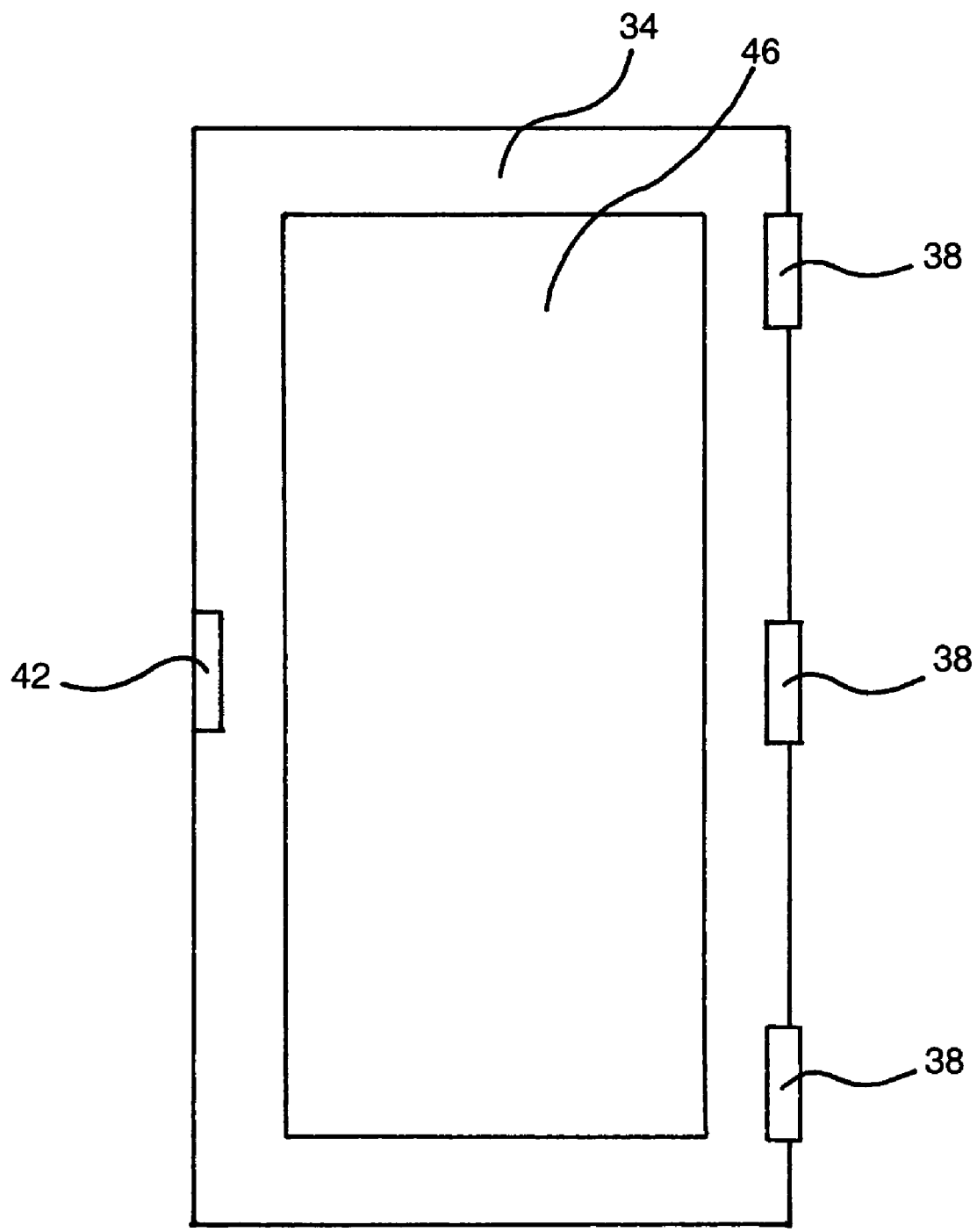
FIG. 3 shows another door according to aspects of the present invention.

Referring to FIG. 3, another door 34 is shown. The door 34 is shown with steel hinges 38 and a steel bracket 42 which are attached or formed integral with the steel door. Additionally, the door 34 has a center opening 46, which is a hole cut or otherwise formed in the center of the door. For training, the hole is typically covered with a destructible material such as plywood, sheetrock, etc. The material may be attached with any variety of means including nuts and bolts, screws, or other fasteners. For this particular door, a trainee may enter by shooting out the center portion or removing the center portion with explosives.

It will be appreciated that the aspects shown in each embodiment of the training door may be combined, thus, a door may be formed which includes the center opening of FIG. 3 and the destructible hinge and catch areas of FIG. 2.

It will be appreciated in viewing FIGS. 1-3 that a variety of different doors may be made by combining different door panels, hinge designs, and latch brackets. By using different combinations of brackets, hinges, and door panels, doors may be made which require the trainee to kick the door in, use a battering ram, shoot certain locations of the door, or use explosives on the door. Thus, the embodiments shown in FIGS. 1-3 are understood to include all of the various assemblies and mechanisms shown in the remaining figures.

Using destructible materials in any portion of the door allows a trainee to break through that portion of the door to enter. Destructible hinges or latch brackets allow the trainee to shoot through the hinges or latch. The latch bracket may be formed so as to not be destructible, but the door may be held closed with a breakable material so that a trainee may kick through the door.

Figure 4:
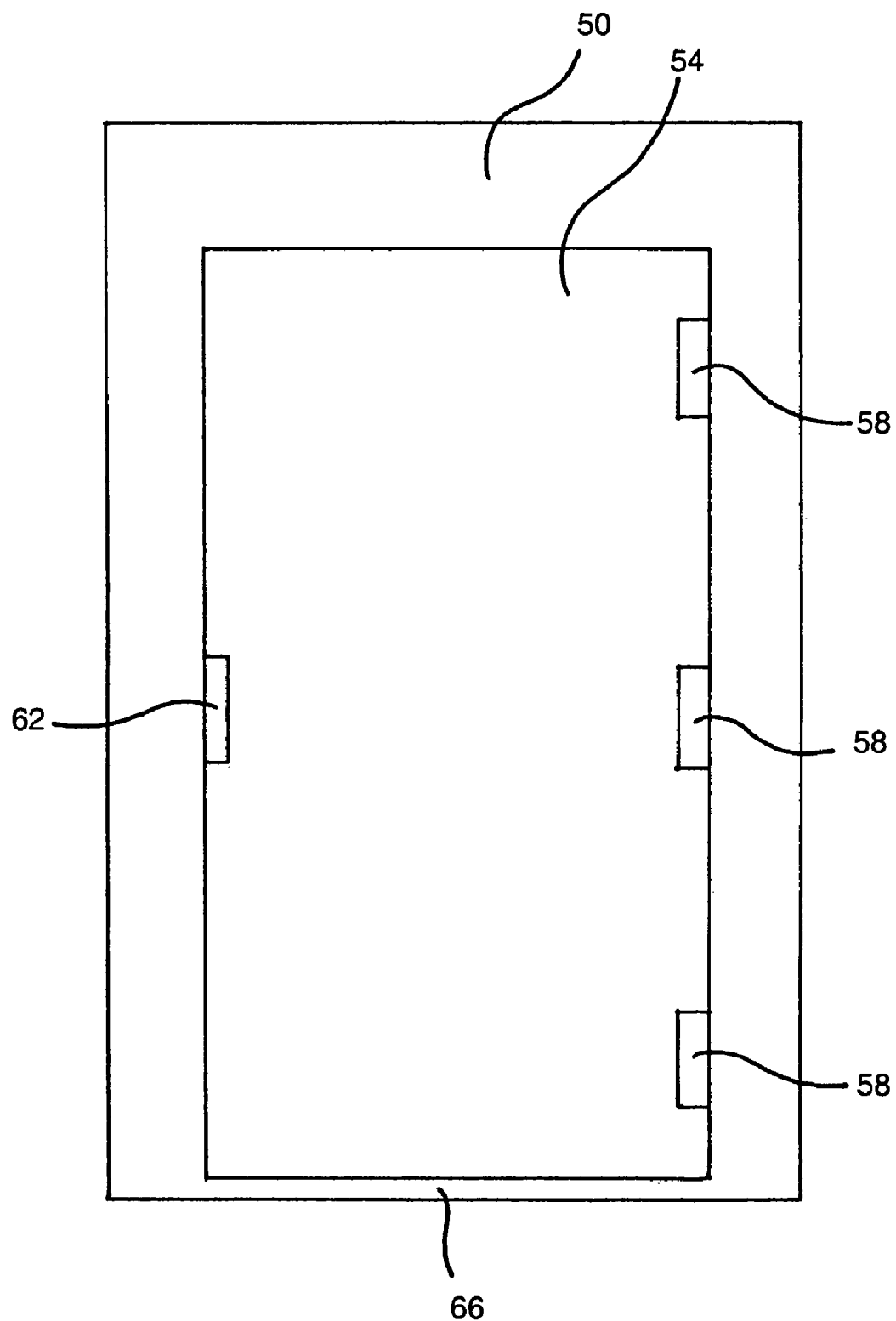
FIG. 4 shows a door frame according to aspects of the present invention.

Turning to FIG. 4, a door frame 50 is shown. Often, the doors used in training are part of a larger shoot house or ballistic training area. Accordingly, it is desirable to have a door which will fit into the training facility without significant modification of the facility. Some ballistic training facilities use modular steel panels joined together to form a building. Accordingly, the door frame 50 may be formed from a steel panel which is the same size as the modular steel wall panels and which fits into an existing shoot house. By using a standard sized steel panel for making a door frame 50, the frame 50 may be placed in a number of different locations in the shoot house, providing for maximum flexibility in designing the training area.

The door frame 50 will typically have a cutout area indicated at 54 which is somewhat larger than a door which would be mounted into the frame 50. The frame may also have a number of hinges 58, and a bracket 62 for mounting the door and securing the door in a closed position. It will be appreciated that the number, type, and location of hinges 58 and brackets 62 may be altered according to the type of door hung and other training needs. For example, a security vault door or armored door may have more hinges or latch brackets than a conventional house or building door. Alternatively, the door frame may provide mounting locations placed around the door opening to thereby attach hinges, brackets, latches, etc. to the door frame and thereby secure the door to the door frame. Thus, a user may mount the type of bracket or latches that are desired to simulate a particular type of door.

Additionally, the door frame 50 may be formed with a lower support piece 66 which supports and strengthens the bottom of the door frame 50 and maintains the bottom of the door frame 50 at the proper width. The lower support piece 66 should not protrude upwardly enough to present a hazard to those passing through the door. The support piece 66 may be formed integrally with the door frame by cutting out an enclosed center portion 54 which leaves a support piece 66. The support piece 66 may also be cut to be an inch wide or so and then twisted 90 degrees to lay flat against the floor.

Additionally, the support piece 66 may be formed from a separate piece which is attached to the door frame 50 by welding, bolting, etc. It will be appreciated that the door frame 50 should be bullet proof, and that welding may weaken the metal and may thus be less desirable than other attachment methods. If the support piece 66 is bolted or otherwise attached to the door frame 50 the attachment method should not leave unprotected areas where bullets may easily pass through.

It will be appreciated that the door frame shown in FIG. 4 may be formed with any of the various types of doors shown, and may be formed with any of the types of hinge and latch mechanisms shown. Thus, the structures shown in the various figures are part of FIG. 4.

Figure 5:
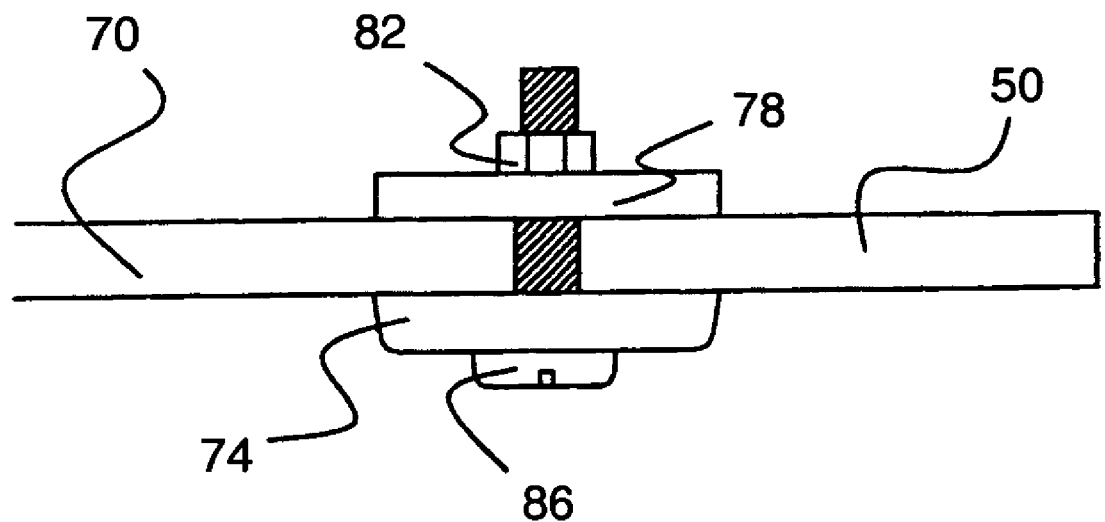
FIG. 5 shows a method of removably attaching steel plates known in the prior art.

If the door and door frame 50 shown in FIG. 4 are to be modular, leaving maximum flexibility in placing the door and establishing different training scenarios, the frame 50 should attach to the modular shoot house in the same manner as the other panels and have the same exterior dimensions as a shoot house panel. FIG. 5 shows a modular shoot house joint as used to attach a door frame to a shoot house wall. The door frame 50 may be attached to another bullet proof panel 70 by placing the edge of the door frame 50 adjacent the edge of the other panel 70, and then using a facing strip 74 to cover the joint, a backing means 78 such as a backing strip or washers to cover the back of the joint, and a number of nuts 82 and bolts 86 to hold the facing strips and backing means tightly against the joint between the panel edges. Additionally, the facing strip 74 and backing means 78 may be bent lengthwise into an angle or formed from material with a generally L-shaped cross-section to place the door frame 50 adjacent a corner in the shoot house.

It will be appreciated that one of the significant advantages of using a ballistic door according to the present invention is the low cost of rebuilding the destructible parts of the door as compared to buying a conventional door. Additionally, the ballistic door may be designed such that rebuilding and re-hanging the door is quick and easy. The cost and ease of rebuilding the destructible parts of the door depend largely on the design of the hinges and latch brackets. Additionally, the hinges and latch brackets should not be quickly damaged when subjected to the demands of ballistic training. Thus, it is advantageous for the hinges and brackets to be formed from plate steel.

Figure 6A:
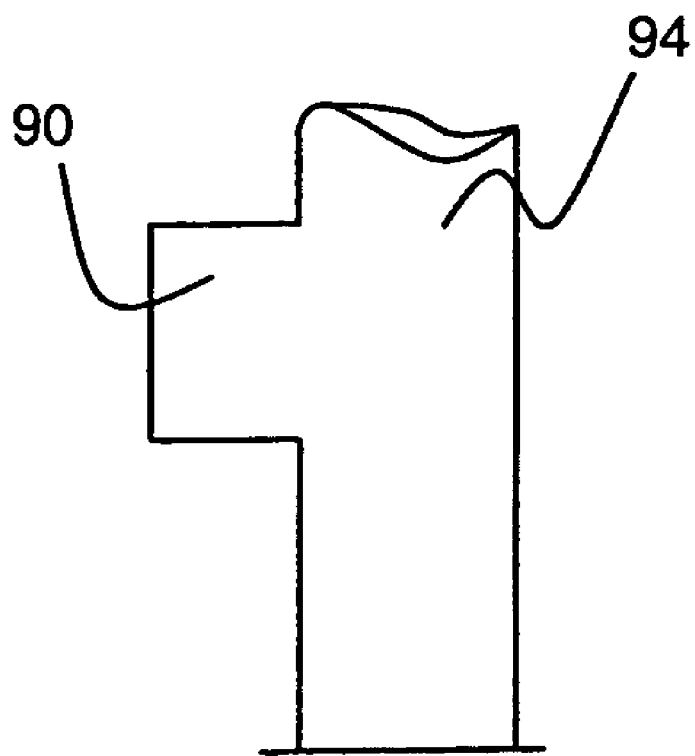
FIGS. 6a-6c show a hinge according to aspects of the present invention.
Figure 6B:
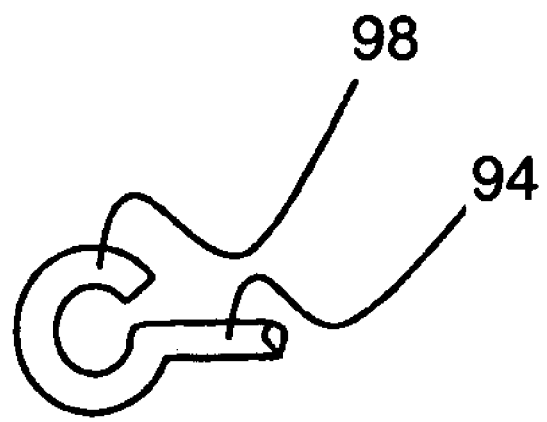
Figure 6C:
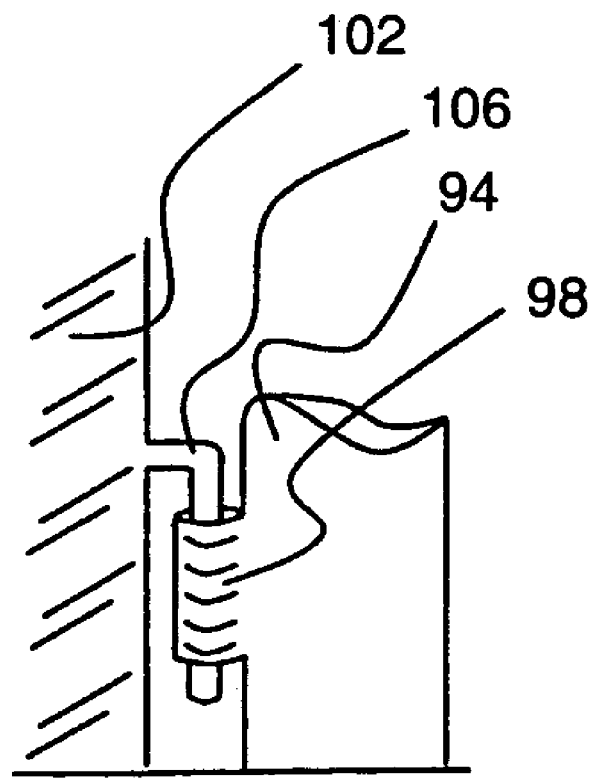

Turning now to FIGS. 6a-6c, a hinge design is shown. Turning to FIG. 6a, a tab 90 may be cut when forming a door frame 94. The tab 90 may then be rolled into a tube 98, as shown in FIG. 6b, which is a top view of the hinge. When the tab 90 is rolled into a tube 98, the tube 98 is adjacent the door frame 94. Referring to FIG. 6c, a side view of the hinge is shown. The door frame 94 and tube 98 are shown. Also shown is a door 102. The door 102 may be formed with an L-shaped bracket 106 which is inserted into the tube 98, forming the completed hinge. The bracket 106 is made sufficiently thick to withstand the weight of the door 102 and the rigors of training. It will be appreciated that the hinge design shown may be used with any of the door types shown and described in the figures.

Figure 7A:
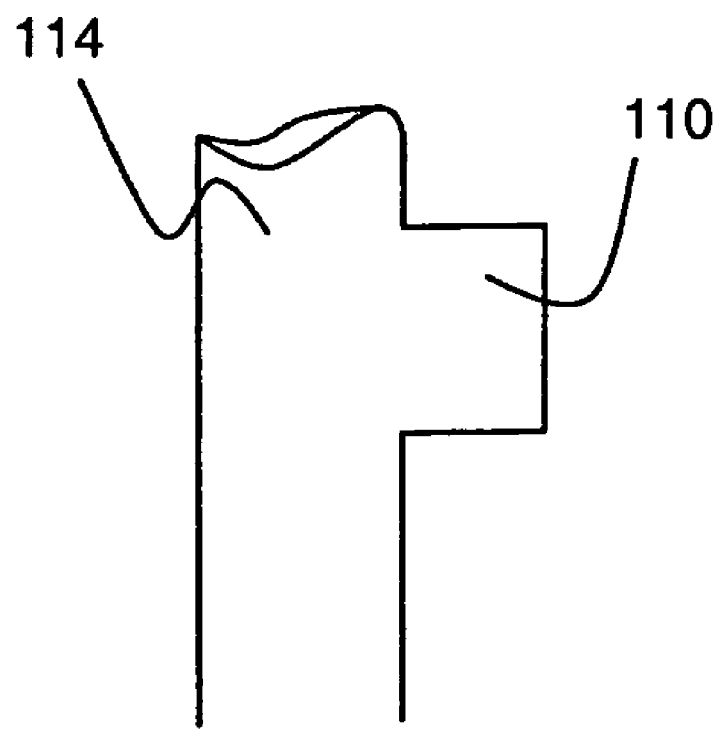
FIGS. 7a-7d show a hinge according to aspects of the present invention.
Figure 7B:
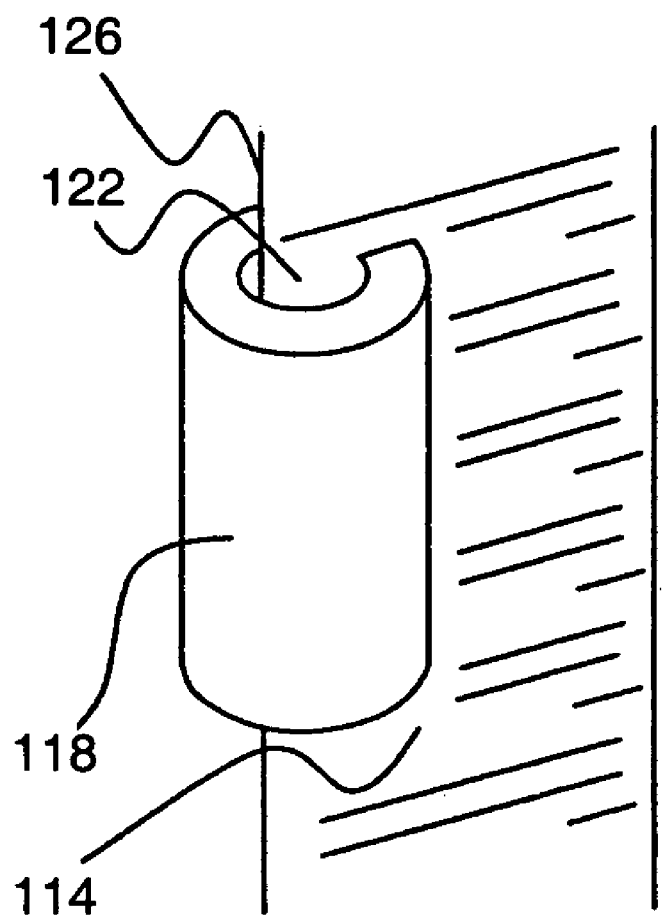
Figure 7C:
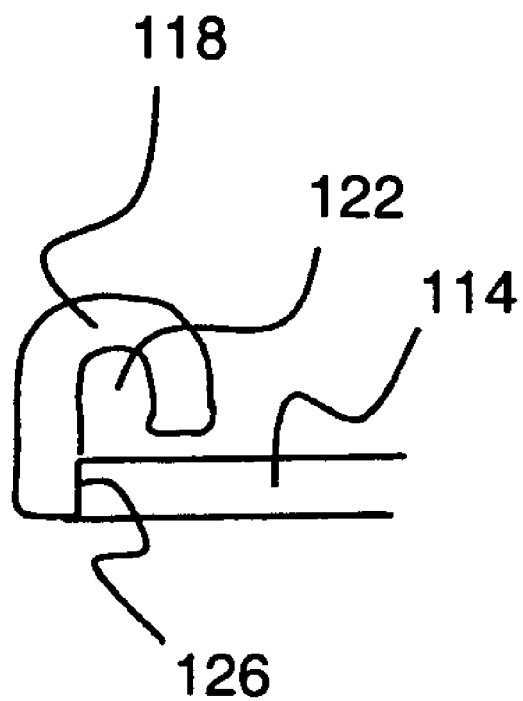
Figure 7D:
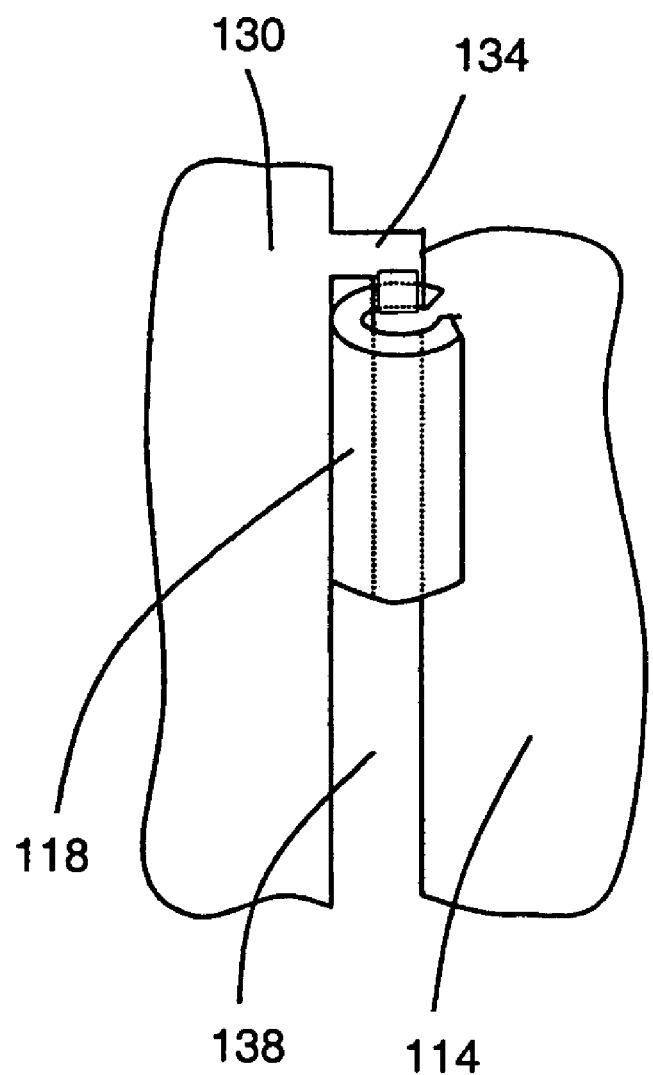

Turning to FIGS. 7a-7d, another hinge design is shown. Similar to the hinge of FIG. 6, a tab 110 is formed when cutting a door frame or hinge plate 114, as shown in FIG. 6a. Referring to FIG. 7b, the door frame 114 is shown with the tab rolled into a tube 118. The hinge may be formed as shown in FIG. 7c, which is advantageous because the hinge tab 110 has been rolled so that the hole 122 formed is inside of the edge 126 of the door frame 114. FIG. 7c is a top view of the rolled hinge tube 118, showing how the hole 122 is inside of the edge 126 of the door frame 114. FIG. 7d shows a door 130 mounted to the hinge. The door 130 has a bracket 134 which is inserted into the hinge tube 118. The hinge shown leaves a smaller gap 138 between the door 130 and the door frame 114, which may reduce the risk of bullets passing through the gap. It will be appreciated that the hinge shown in FIGS. 7a-7d may be used in combination with any of the doors and door frames shown, and are thus part of those embodiments.

Figure 8A:
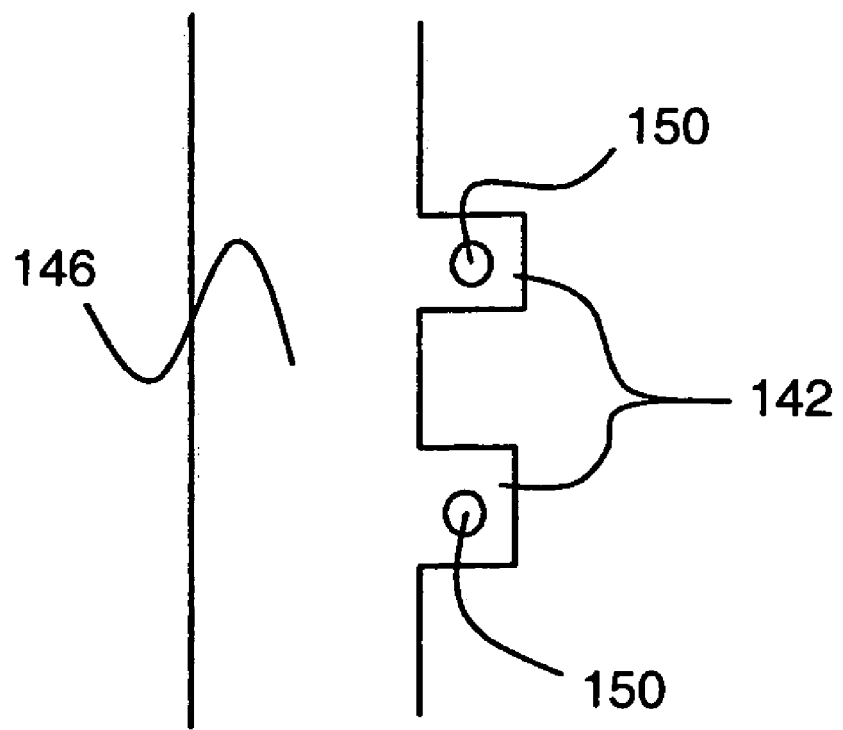
FIGS. 8a-8c show a hinge according to aspects of the present invention.
Figure 8B:
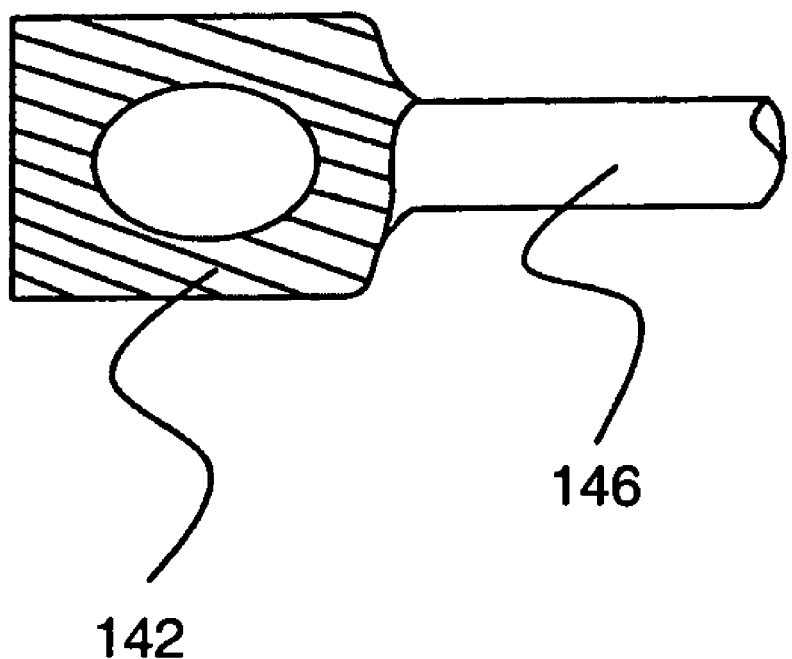
Figure 8C:
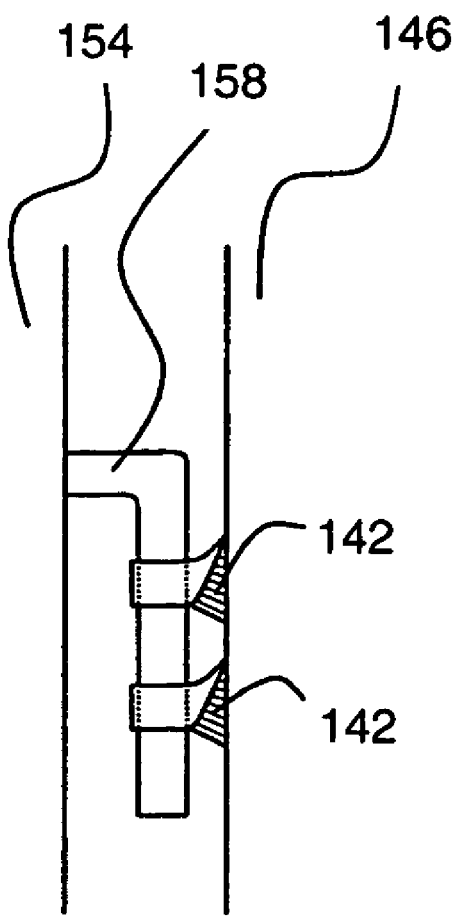

Turning to FIG. 8a, a hinge is shown which uses multiple tabs 142 attached to the door frame 146. The tabs have holes 150, which may be punched, cut, drilled, or otherwise formed. FIG. 8b is a top view of the frame, showing how a tab 142 is twisted 90 degrees relative to the frame 146. FIG. 8c is a side view of the hinge, showing how a pair of tabs 142 form a hinge. The door 154 has a bracket 158 which is inserted into the holes formed in the tabs.

The hinge of FIG. 8 may be used with any of the doors shown, and should be regarded as part of those embodiments.

Additionally, the hinges shown in FIGS. 6-8 may be formed as separate pieces or attached to a strip of metal instead of being formed as part of a door frame. Thus, the hinges may be made to attach to a large variety of shoot houses and training facilities, increasing the compatibility of the door.

Using hinges such as the type shown in FIGS. 6-8, the door may be simply lifted out of the door frame to rebuild the door for a future training exercise. The ability to lift the door out of the door frame simplifies the rebuilding process and allows for faster replacement of the door. For example, multiple doors may be prepared for a training exercise. After each successful opening of the door, the used and damaged door may be removed and a new door installed in a matter of seconds. The doors may be rebuilt during rather than between exercises, minimizing delays.

Figure 9A:
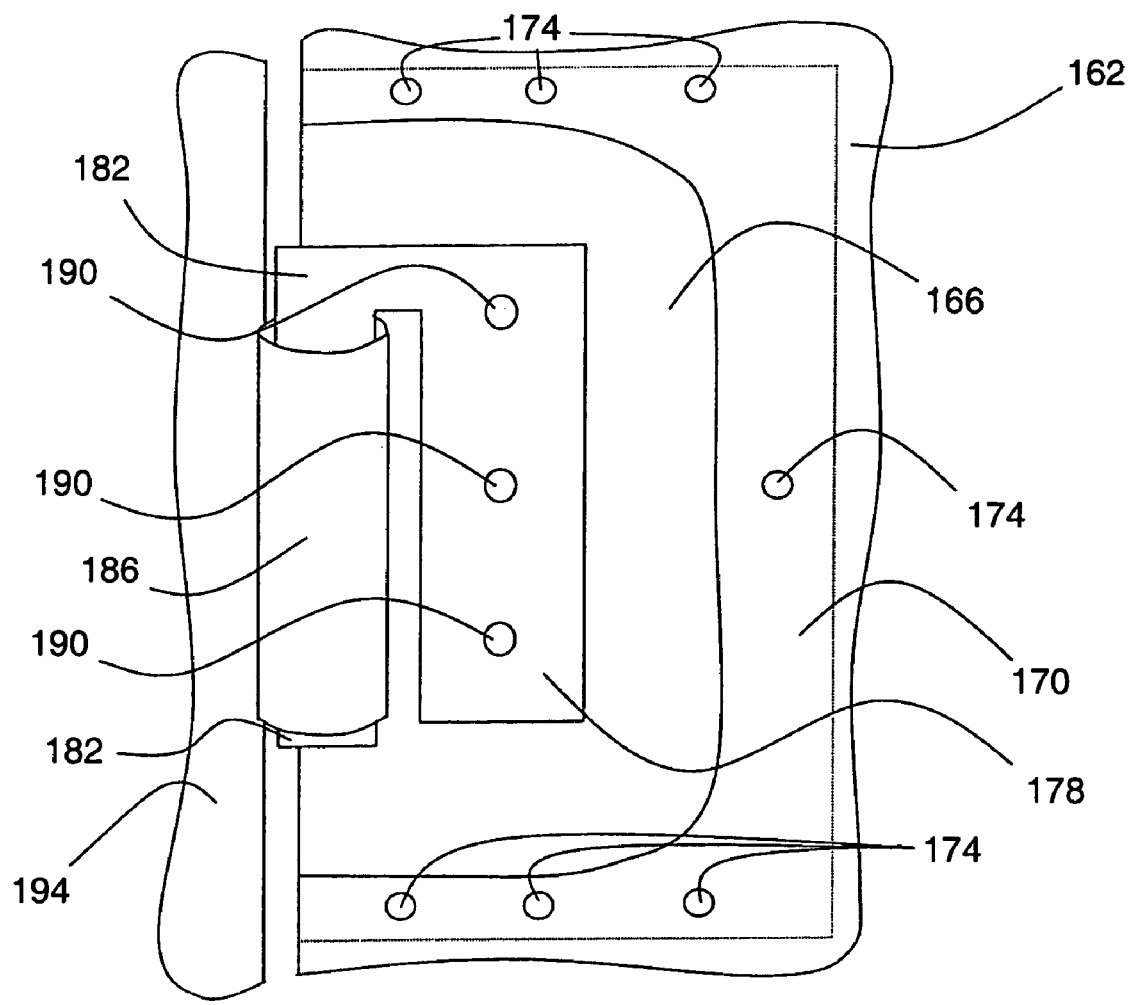
FIG. 9a shows a hinge according to aspects of the present invention.

Turning to FIG. 9a, an example hinge attachment to a door is shown. The door 162 has a cutout portion 166. Typically, the cutout portion 166 is covered with a piece of a destructible material 170, shown in dashed lines attached to the back side of the door 162. The destructible material may be bolted or screwed to the door 162 using holes 174.

A hinge pin 178 is mounted to the destructible material 170. The hinge pin 178 may be a U shaped bracket, with one leg of the U forming a pin 182 which fits inside of the tube portion 186 of the hinge and is sized to allow easy movement of the door. The hinge pin 178 is sized to carry the weight of the door 162 and the forces applied to the door 162 during training exercises. The hinge pin 178 is typically bolted to the destructible material 170 through holes 190 formed in the door 162. As discussed earlier, the tube 186 is typically attached to a door frame 194. It will be appreciated that the hinge pin may be attached to the door frame, and the tube portion of the hinge may be attached to the door.

The cutout portion 166 is typically larger than the hinge pin 178, allowing a trainee to shoot or blast away the destructible material 170. Advantageously, the destructible material 170 may be easily replaced by unbolting the material 170 from the door 162 and the hinge pin 178, and bolting a new piece of destructible material 170 in its place. Holes may be easily drilled in the material 170 to match the holes in the door 162 and hinge pin 178. Thus, the destructible material 170 may be replaced on site with only a drill and a few wrenches.

Additionally, the size of the opening 166 in the door 162 may be adjusted to allow for proper clearance around the hinge pin 178 and to provide the desired size of destructible material 170 which is exposed.

It will also be appreciated that the hinge pin 178 may be bolted directly to the plate steel which is used to form the door. As such, a person may not blast away any destructible material to open the door at the hinge, and must focus efforts on other areas of the door such as the latch. Forming a hinge 178 which is removably attached to the door may allow for more efficient use of raw materials as compared to cutting the hinge pin integral to the door, and allows for replacement of the hinge pin separate from the door.

Figure 9B:
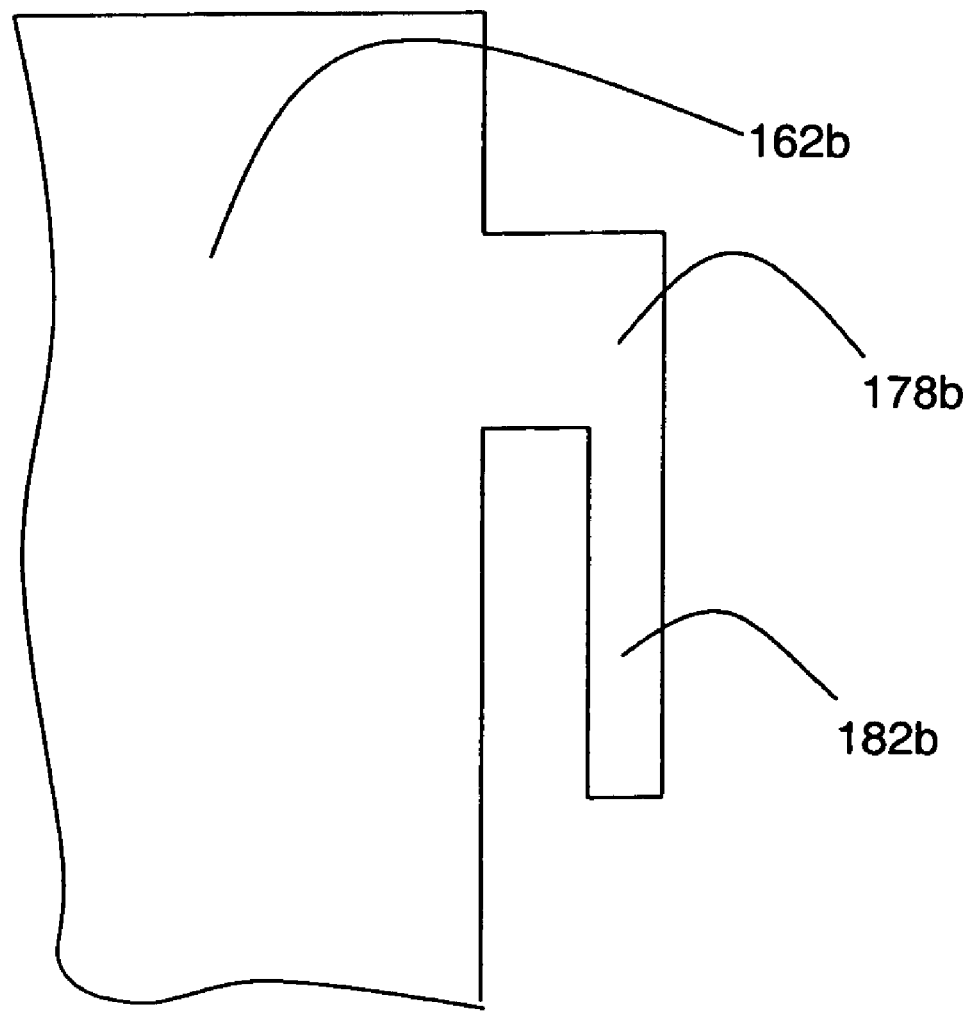
FIG. 9b shows a hinge pin according to the present invention.

Referring to FIG. 9b, a fragmented view of a door 162b is shown with a hinge bracket 178b formed as part of the door 162b. The hinge bracket 178b has an elongate section 182b which is sized to fit inside of a hinge tube or hole. A door hinge pin as shown usually should not be shot or blasted to open the door, as it is formed of plate steel. Thus, alternate methods are typically used to open the door. Additionally, the hinge bracket 178b may be formed separate from the door and welded or otherwise attached to the door, but may not be as strong as a bracket which is formed integrally with the door. It will be appreciated that the hinges shown in FIGS. 9a and 9b may be used in combination with any of the types of doors and door frames shown, and should be considered as part of those embodiments.

Figure 10:
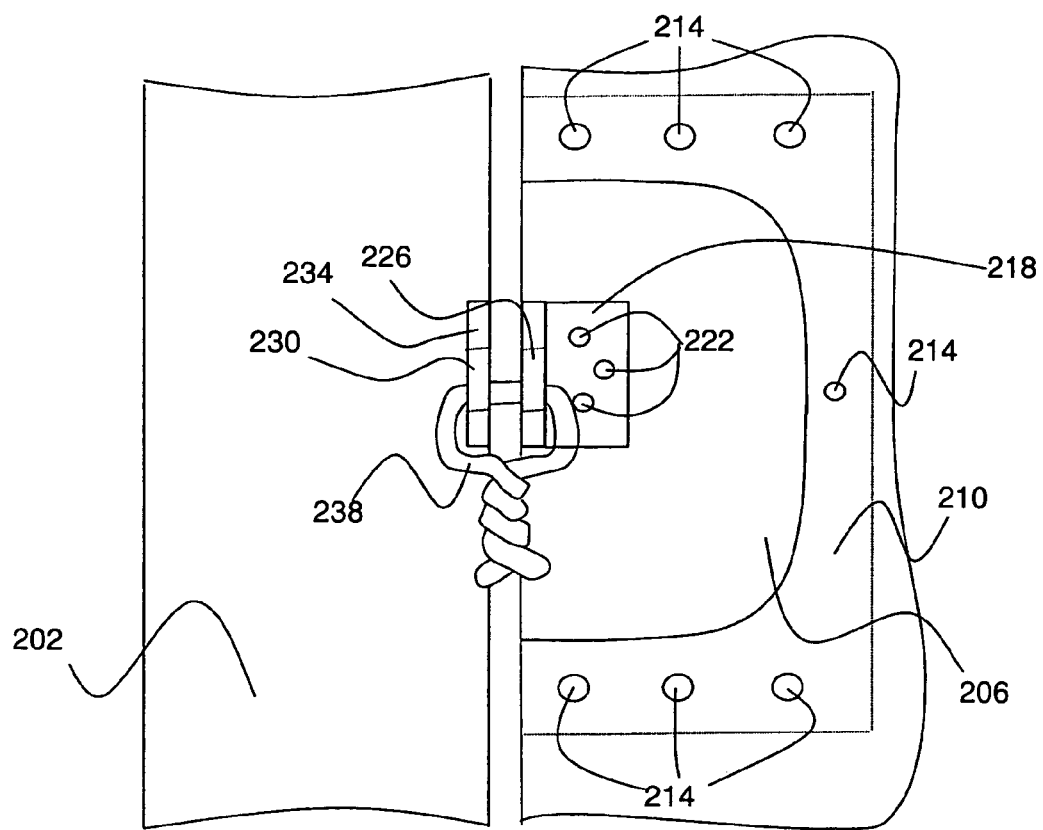
FIG. 10 shows a latch bracket according to aspects of the present invention.

Turning to FIG. 10, a portion of a door 198 and door frame 202 are shown. The door 198 has a cutout portion 206 which is covered with a destructible material 210, shown in dashed lines on the back side of the door. The destructible material 210 is typically bolted or screwed to the door 198 using holes 214 formed in the door 198.

An L-shaped latch bracket 218 is typically bolted or screwed to the destructible material 210 using holes 222 formed in the bracket 218. The latch bracket 218 is typically formed with a hole 226. A corresponding hole 230 is formed in a bracket 234 formed in the door frame 202. The bracket 234 is typically formed in the door frame 202 by cutting the door opening in the door frame 202 so as to leave a tab, forming a hole in the tab, and bending the tab 90 degrees to form the bracket 234. Holes 226 and 230 are used to hold the door closed, and simulate the door knob and latch. A piece of wire 238, a wire tie, a plastic tie strip, or other materials may be used to hold the door closed.

In forming a door and door frame, multiple latch brackets may be used to simulate different types of doors. Security doors or vault doors may have more latch brackets and hinges than a conventional door, and may be more difficult to open.

In use, a police officer, soldier, etc. may open the door in a variety of ways. The door can be kicked, battered, pried, shot, or blasted to cause either the wire 238 or the destructible material 210 to fail. The destructible material 210, the wire 238, or the entire door may then be replaced for subsequent training exercises. It will be appreciated that the areas of the door constructed with destructible material and the strength of the destructible material may be altered to vary the methods which will successfully open the door and the amount of force required to open the door.

The latch bracket shown in FIG. 10 may be used in combination with any of the door and door frame styles shown, and should be considered as part of those embodiments. It will be appreciated that, according to the present invention, a particular training door may incorporate many different features such as destructible portions, hinges, latch or catch mechanisms, etc. As such these various features are shown individually for greater clarity in showing the structure and in explaining the function of the particular feature. Thus, the invention properly comprises a training door with any of the various features shown in the drawings.

Figure 11A:
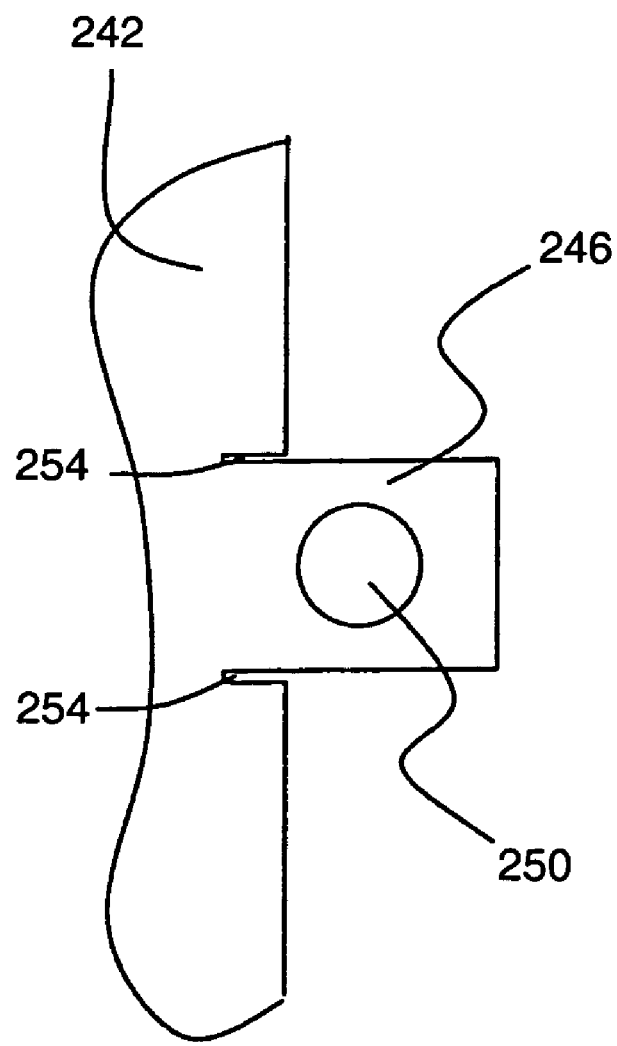
FIG. 11a-c shows a latch bracket according to aspects of the present invention.
Figure 11B:
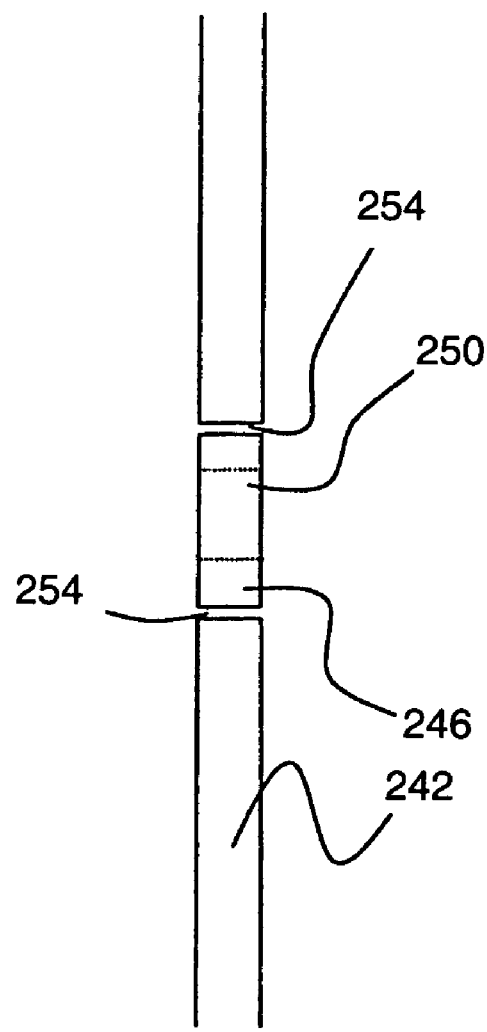
Figure 11C:
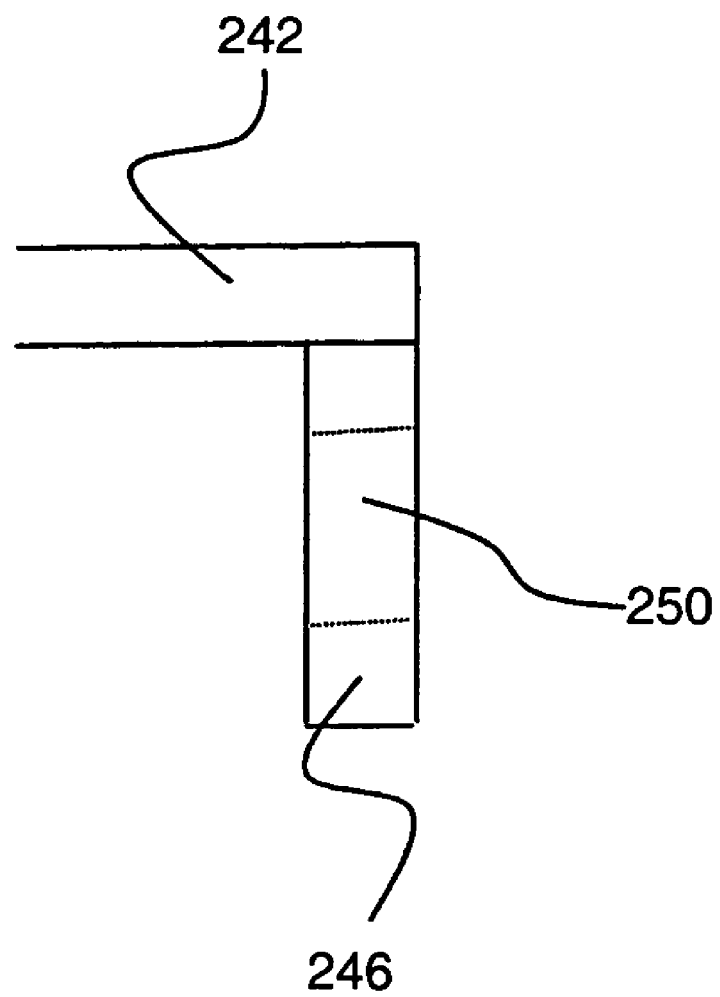

Turning to FIGS. 11a-11b, door or door frame 242 is shown with a tab 246 cut for a latch. The tab 246 has a hole 250 formed in it. A slot 254 may be formed along the sides of the tab 246. The slot allows the tab 246 to bend so that it does not extend past the side of the door or door frame 242, as shown in FIG. 11c. The tab shown may be used as part of a latch or catch mechanism with any of the doors or door frames shown and should be considered as part of those embodiments.

Figure 12A:
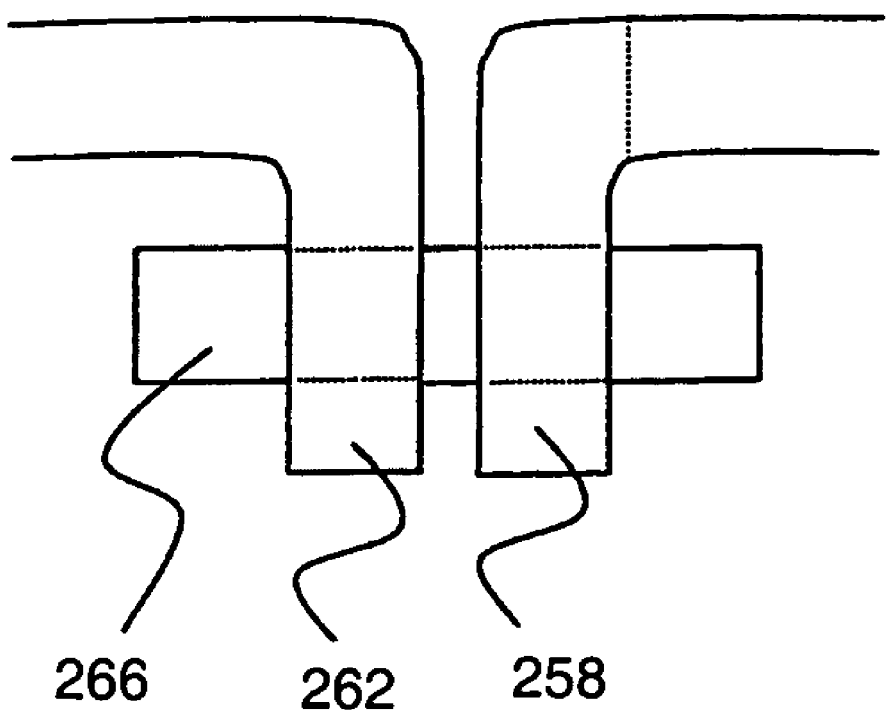
FIG. 12a-d shows a latch bracket according to aspects of the present invention.

Referring to FIG. 12a, a door latch 258 and door frame latch 262 are shown with a dowel, plastic rod, or bolt 266 extending between the holes formed in the latches (as shown in FIGS. 11a-c). The dowel, plastic rod, or bolt 266 is used to hold the door shut. Various sizes of dowels or plastic rods may be used to vary the amount of force necessary to break the dowel or rod and open the door. A nut and bolt may be used when the door is not intended to open by kicking the door or by causing failure of the door at the lock. Such a scenario might simulate a door with multiple dead bolts or armor protecting the lock, or where the door is otherwise more likely to fail at the hinges.

Figure 12B:
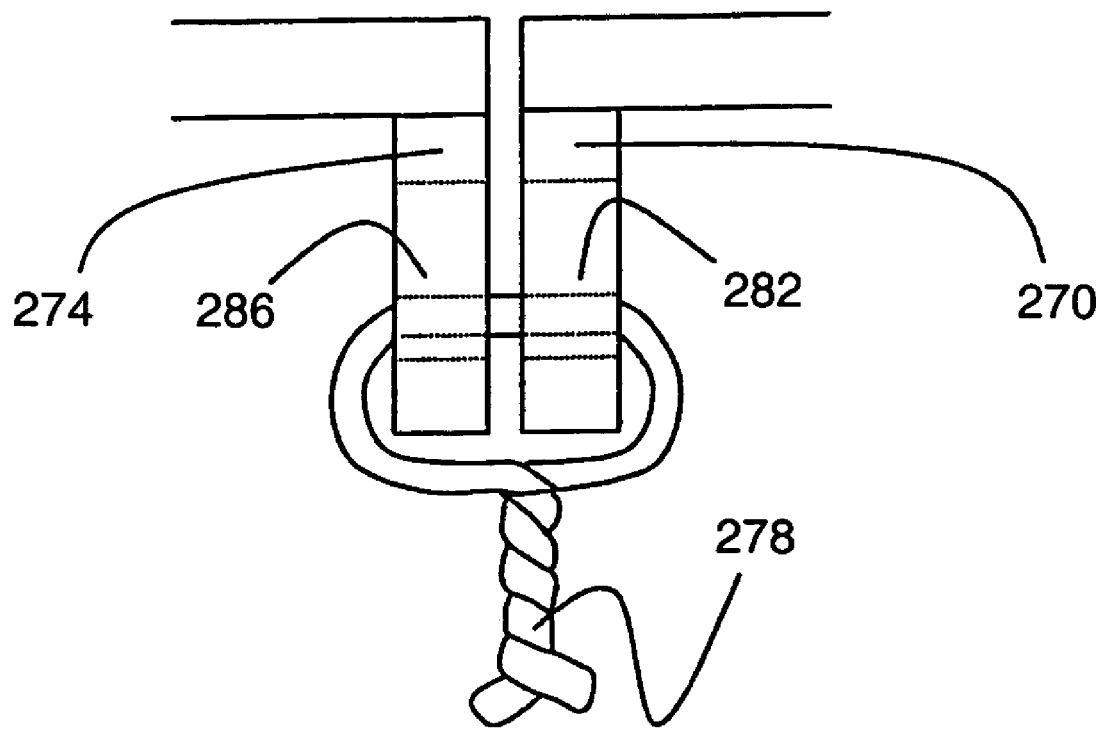

Turning to FIG. 12b, a door latch 270 and door frame latch 274 are shown. The latches have a piece of wire 278 which is placed through the holes 282, 286 formed in the latches. The wire is used to hold the door shut. The size of the wire 278 may be varied to alter the force necessary to open the door. Additionally, wire ties or plastic cable ties or the like may be used to provide a varying resistance to opening the door. Accordingly, the door may be customized to different training scenarios by altering the force necessary to break through the door latch.

Figure 12C:
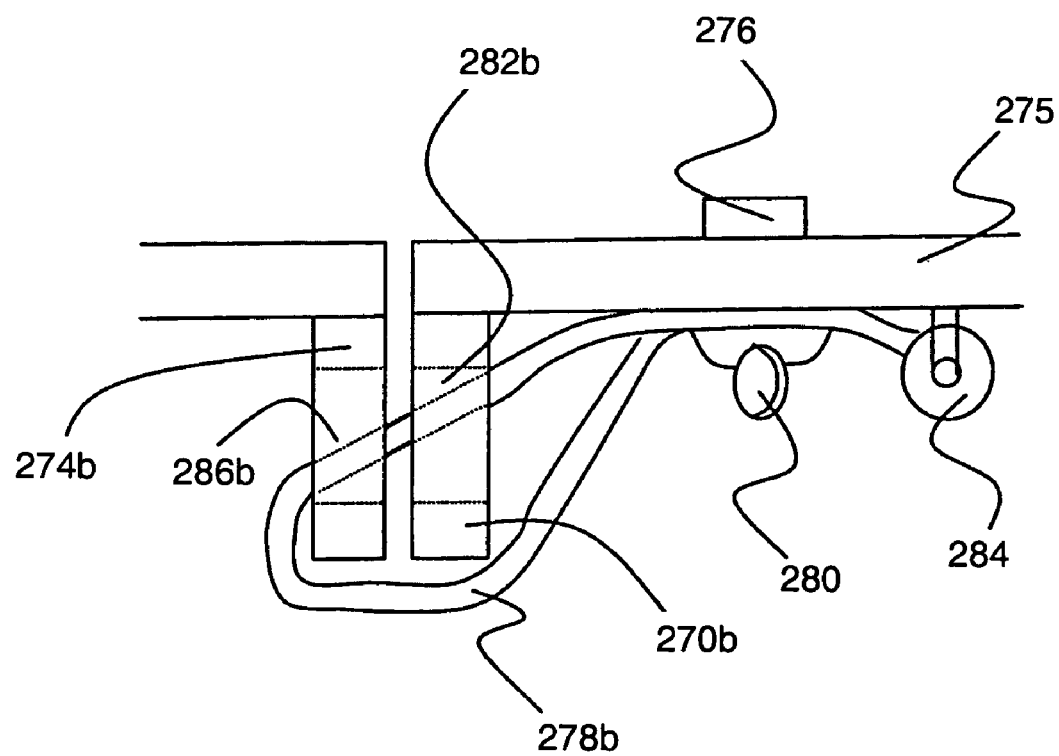

Referring to FIG. 12c, a door latch 270b and door frame latch 274b are shown. A piece of wire 278b is placed through the holes 282b, 286b which are formed in the latches. The wire 278b may be attached to the door 275 using a nut 280 and/or bolt 276 to thereby secure the wire to the door. Smaller pieces of wire 278b may be used to secure the door, or a roll of wire 284 may be attached to the door, so that wire may be pulled off of the roll as needed to close and secure the door for training. It will also be appreciated that the roll of wire and attachment nut or bolt may be placed on the door frame instead of the door. The location of the wire, nut, bolt, etc. may be chosen as best suits each particular application.

Figure 12D:
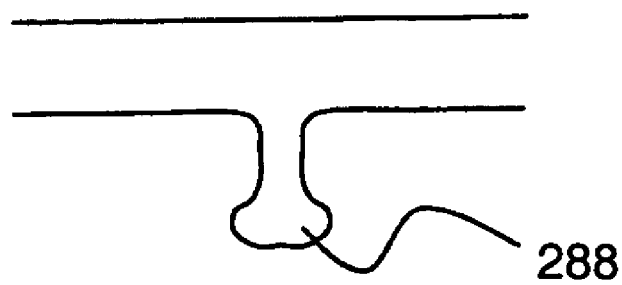
Figure 12D:
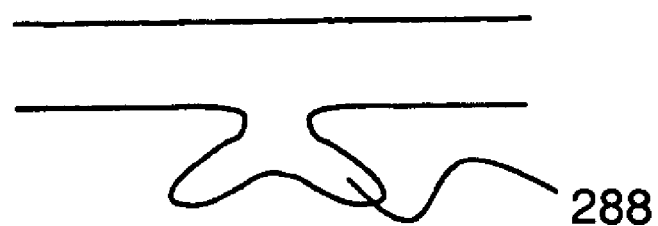
Figure 12D:
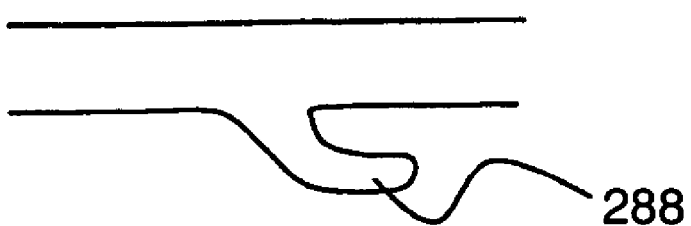

Additionally, there are other means to secure the wire and hold the door in a closed position. Cleats or binding posts may be placed on the door, door frame, or both, allowing the wire to be wrapped around the cleats or posts to attach the wire and secure the door in a closed position. Referring to FIG. 12d, various cleats or binding posts are shown. It will be appreciated that many different styles of binding posts 288 may be used.

One or more of the binding posts 288 may be attached to the door or door frame. For example, one or more binding posts may be attached to either the door or door frame such that wire is passed through the latch brackets on the door and door frame and the ends of the wire are secured to the binding posts. Alternatively, one or more binding posts may be attached to the door and one or more binding posts may be attached to the door frame, such that wire is wrapped between the binding posts on the door and the binding posts on the door frame to secure the door. The latch mechanisms shown in FIGS. 12a-12d may be used in combination with any of the door or door frame styles shown, and should thus be considered as part of those embodiments.

Figure 13:
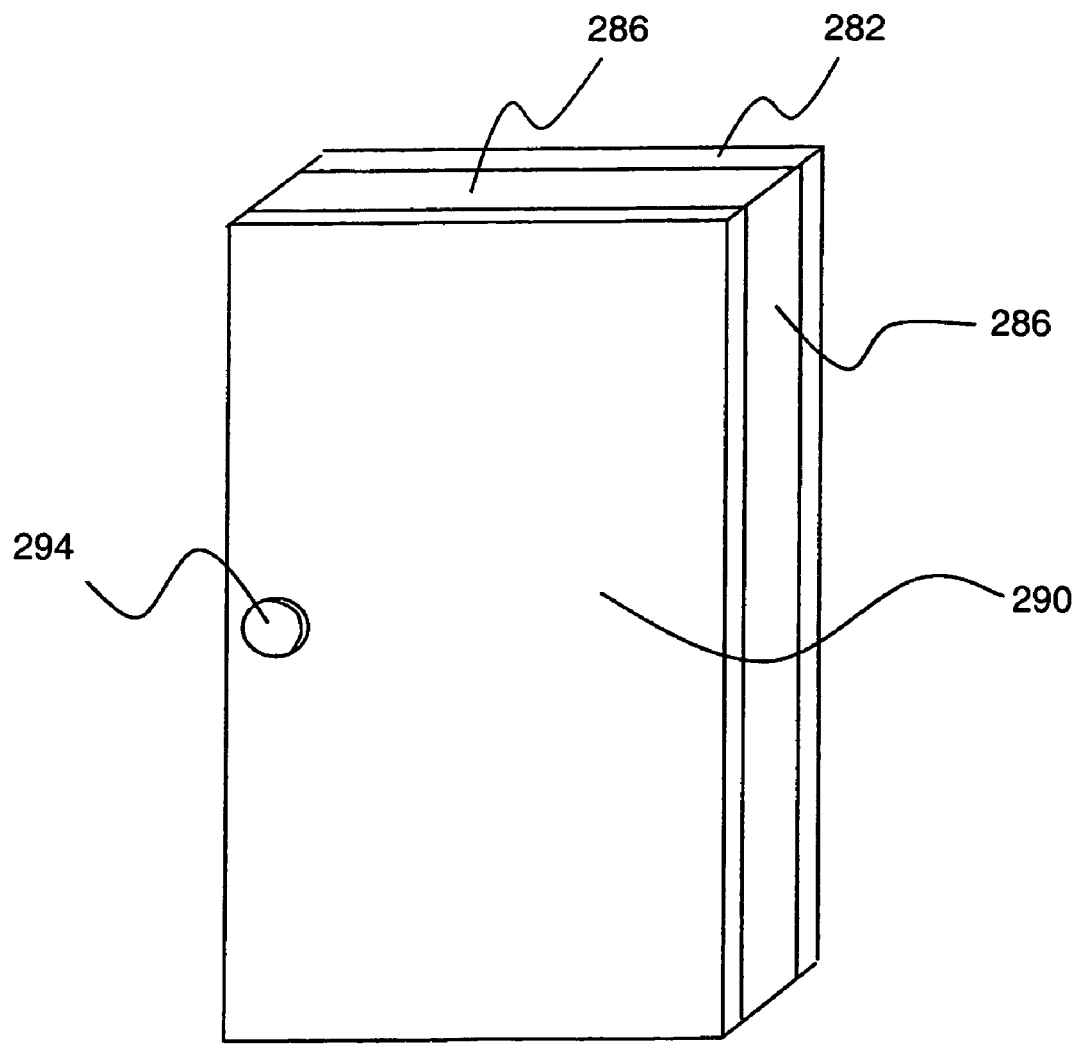
FIG. 13 shows a door with a bullet containment frame according to aspects of the present invention.

Turning to FIG. 13, a door is shown which has been covered with a bullet containment frame. The door is formed from plate steel 282 and has frame pieces 286 attached to the door. The frame pieces 286 are typically wood, and may commonly be a one or two inch square strip of wood as long as is needed to extend along the edges or across the center of the steel plate 282. The strips 286 would typically be bolted or screwed to the steel plate 282, and holes may be formed in the steel plate for that purpose.

A sheeting material 290, such as plywood, acoustic tile, sheetrock, etc. is attached to the frame pieces 286 by bolting, nailing, or the like. The sheeting material 290 will typically be pierced by bullets which are stopped by the steel plate in the door. The sheeting material 290 will contain bullets which may ricochet off of the steel plate. Additionally, the sheeting material makes the ballistic door 282 look more like a conventional door. A door knob or similarly shaped object 294, such as a block, may be attached to the door sheeting 290 to make the door look more similar to a conventional door.

The frame and sheeting material makes the door look more realistic to a trainee, hides the weak spot in the door which must be exploited to enter the door, and makes the door safer by containing bullets which may ricochet off of the steel plate in the door.

A frame and sheeting material may be placed on the back of the door if desired, or the back of the door may be left uncovered, as a trainee would typically approach the door from a single side and break the door open. It will be appreciated that the sheeting material and a containment frame as shown may be used in combination with any of the door and door frame styles shown, and may be used with any of the latch and hinge mechanisms shown. Thus, a door may be made which has a breakaway latch, destructible hinge attachments, and/or an opening in the steel sheet to allow for smashing through the door, and which utilizes the containment frame as shown to increase the safety or realism of the door. The containment frame and sheeting should thus be considered as part of the aspects of the invention shown in the other figures.

Figure 14:
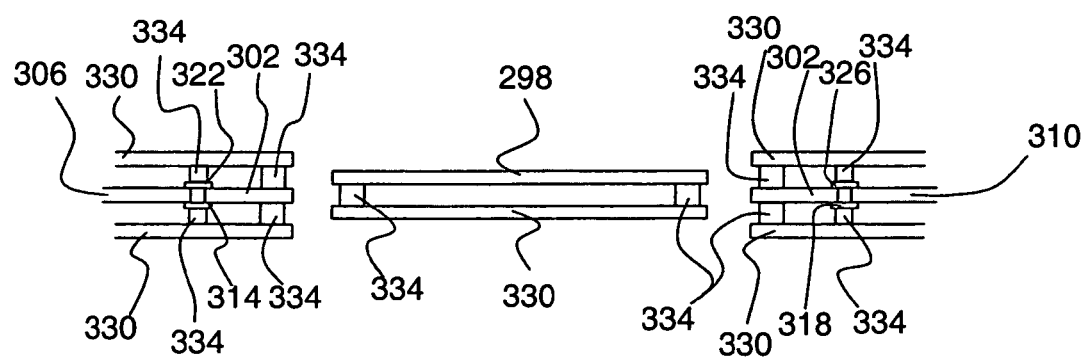
FIG. 14 shows a bullet containment frame according to the present invention.

Turning to FIG. 14, a cross section of a wall with a door frame and door is shown. The steel plate door 298 is removably attached to a door frame 302. The hinges and latch bracket attaching the door to the two sides of the frame are not shown for clarity, but are obviously part of the embodiment shown, as well as any destructible openings or attachment locations as is desired. The frame 302 is attached to adjacent bullet proof steel wall panels 306 and 310 by facing strips 314 and 318, backing means 322 and 326, such as strips or washers, and nuts and bolts (not shown). The nuts and bolts hold the facing strips and backing means against the steel plates 306 and 310 and the door frame 302 and prevent bullets from passing between the joint formed by the edges of the door frame and steel plates.

Sheeting material 330 is attached to the steel plates 306, 310, steel plate door frame 302, and steel plate door 298 via spacer strips 334. The spacer strips 334 and sheeting material 330 form a bullet containment frame which retains bullets which strike the walls of the shoot house and prevent ricocheting bullets from striking trainees, and also may increase the realism of the wall and door. The bullet containment frame may be placed on one side of the door as shown, or both sides of the door if desired. The spacer strips 334 may be formed from wood, metal, plastic, etc. The sheeting material 330 may be formed from plywood, hardboard, sheetrock, etc. as is desired. It will be appreciated that the frames and sheeting material shown, as well as the door frame and attachment to a wall panel as shown may be used in combination with any of the doors or door frames shown, and with any of the hinges and latch mechanisms shown, and thus should be considered as part of those embodiments.

Figure 15:
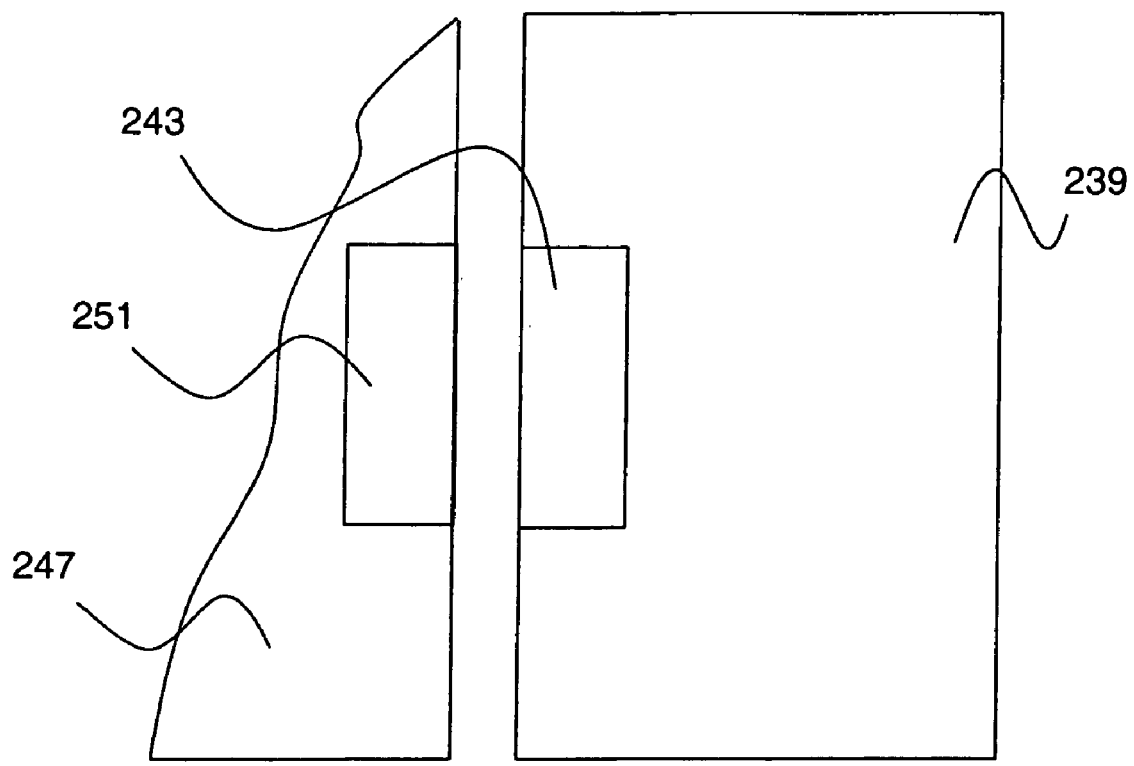
FIG. 15 shows another door according to the present invention.

Turning to FIG. 15, another door according to the present invention is shown. The door 239 is designed to represent a door which opens out. A door which opens out instead of opening into a room must be pried outwardly to open the door, instead of being forced inwardly. Accordingly, the door 239 may be constructed with a piece of wood or other suitable material 243 covering the latch area of the door. The door frame 247 may also have a piece of wood or other material 251 which is sized to approximate a conventional door jamb. Thus, in training, an individual may insert a pry bar between spacers 243 and 251, and pry the door open.

Preferably, the construction of the door is made so that the door and door frame appear similar to a door which a police officer or other individual would encounter outside of training. Thus, the wood or other consumable material would ideally extend the length of the door. However, as shown in FIG. 15, smaller pieces of wood or material may be used to minimize cost.

Typically, the door will have hinges and a latch bracket, with the latch bracket placed on the side of the door opposite the blocks 243, 251. As discussed previously, the force necessary to open the door may be varied by varying the attachment at the latch bracket, such as the thickness of wire used. The door shown in FIG. 15 is typically used with the desired hinge, latch, and sheeting mechanisms shown in the remaining figures, and as such those subassemblies shown in the other figures should be considered as part of the present invention.

It will be appreciated from the preceding discussion that numerous door configurations are possible using the present invention. The number and type of hinges or latch brackets may be varied to simulate many different types of doors. Sections of the door may have openings in the steel plate which are covered with a destructible material to allow trainees to shoot or blast through the section of the door. The strength of the destructible material or object used to hold the door closed may be varied to vary the amount of force required to open the door. The door may be covered with sheeting material to alter the look of the door and hide the weak spots in the door. Thus, any number of different doors may be produced for different training scenarios.

The door may be sized to fit existing openings in shoot houses and training facilities with hinges or a strip of steel with integral hinges formed to attach the door to the facility. Alternatively, a door frame may be cut from a panel of steel which is the same size as modular panels used to construct modular shoot houses, allowing the door to be mounted in virtually any location within a modular shoot house. Thus, maximum flexibility is provided in creating different training scenarios within a shoot house or training facility.

Once the door is used in training, the destructible sections of the door, such as the destructible sections surrounding hinges or latches and the bullet containment frame sheeting or frame members, may be replaced quickly and easily using only simple tools such as a saw, drill, hammer, and wrenches, allowing the door to quickly be rebuilt for the next training scenario. The door may even be rebuilt on site. Additionally, the destructible sections may be replaced with readily available and inexpensive materials such as wood, plywood, construction paneling, acoustic ceiling tile, sheetrock, etc. Thus, the door may be rebuilt for very low cost, significantly lower than the cost of replacing even an inexpensive interior door.

Figure 16:
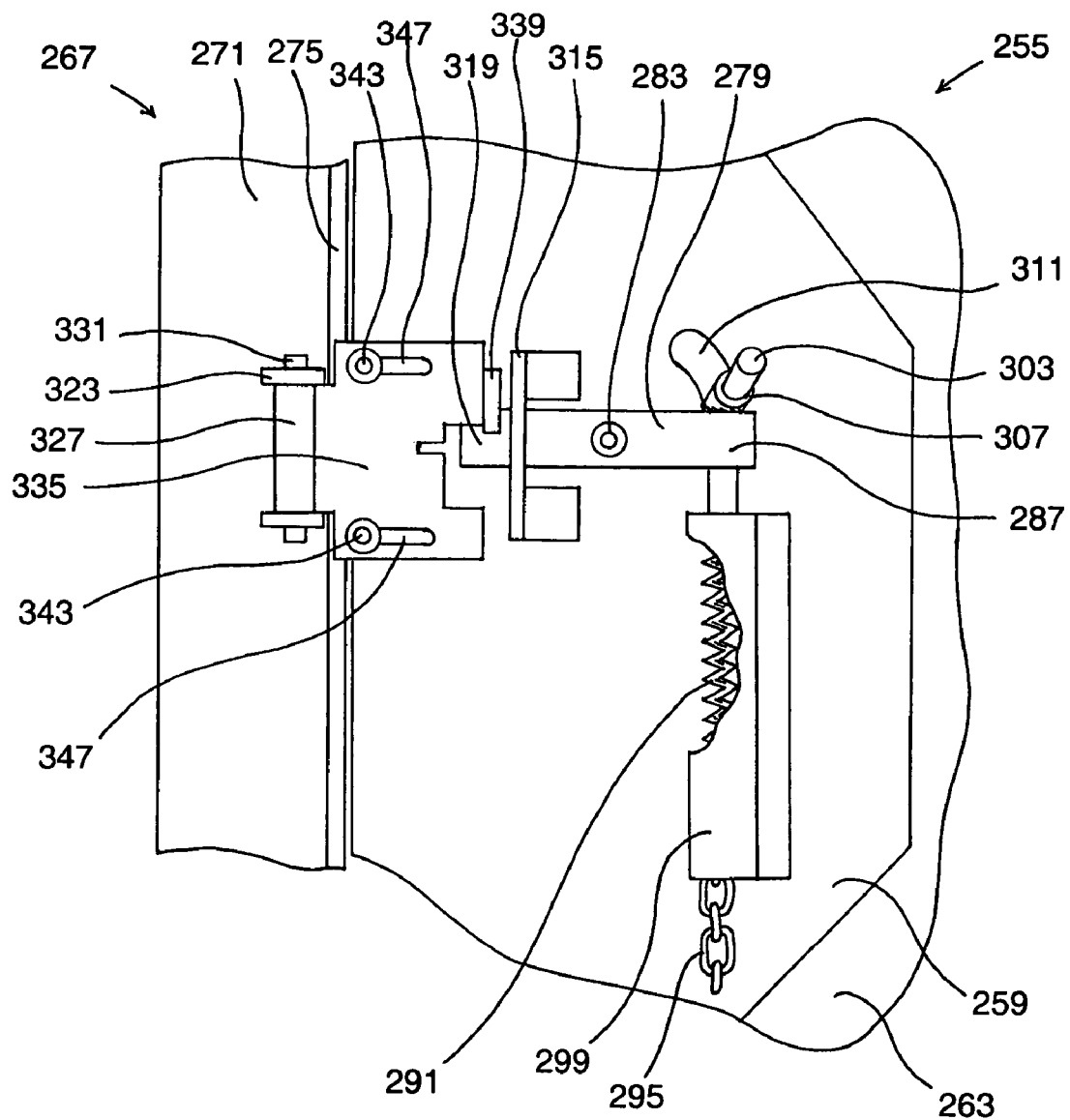
FIG. 16 shows door latch mechanism according to the present invention.

Turning now to FIG. 16, a fragmented view of a closure or latch mechanism on another door in accordance with the present invention is shown. The door, indicated generally at 255, is formed with a steel frame 259 and a plywood covering 263. The door frame, indicated generally at 267, has been formed in a T shape, having a flat plate 271 oriented parallel to the door and another plate 275 oriented perpendicular to the door. The door is held closed by a latch mechanism which allows a person to apply force to the door, such as by kicking the door, and thereby release the catch mechanism. A catch lever 279 has been attached to the door 255 with a bolt 283, which also functions as a pivot point for the catch lever. A first end 287 of the catch lever 279 is attached to a spring 291 for biasing the first end 287 of the lever 279 in a downward position. The spring 291 is also attached to a chain 295 which is used to tension the spring. A cover 299 is used to protect the spring 291, and a slot formed in the bottom of the cover is used to lock the chain 295 in a particular location by sliding a link of the chain into the slot. Pulling on the chain and then sliding it into the slot enables the tension on the spring to be increased. It will be appreciated that while a spring is shown, a number of different biasing elements may be used including but not limited to springs, rubber or elastic members, or even weights.

A rod 303 is attached to the first side 287 of the lever 279 and used as a handle to open the door 255 or close the door and set the lever. The rod 303 is ideally mounted in a tube 307 which allows the rod to be slid forwards or backwards, and allows the rod to be slid through a slot 311 in the door 255 to quickly open the door from the other side of the door if desired. A bracket 315 is mounted over a second end 319 of the lever 279 and used to limit the movement of the lever, both rotational movement as the lever is used to open or close the door 255, and movement away from the door as the door is forced open. It will be appreciated that the spring 291 biases the second end 319 of the lever 279 in an upward position.

A hinge bracket 323 is attached to the door frame 267, the hinge bracket being formed for receiving a tube 327 and a pin 331. The tube 327 has a hinge plate 335 attached to the tube. The hinge plate 335 is attached to a catch plate 339 which engages the second end 319 of the lever 279. The surface of the catch plate 339 which engages the lever 279 has a curved, angled, or stepped profile as will be discussed in more detail below to vary the amount of force required to open the door 255. Thus, to latch the door 255 closed, the door is pulled closed, the first end 287 of the lever 279 is lifted to lower the second end 319, the hinge plate 335 is rotated against the door as shown, and the lever is released to engage the catch plate 339. To open the door, the door must be manually opened by lifting the rod 303 or pushed with sufficient force to cause the hinge plate 335 to rotate away from the door, thereby causing the second end 319 of the lever 279 to rotate down, against the force of the spring 291, sufficiently to allow the catch plate 339 to escape the lever 279. The movement of the opening door 255 pushes against bolts 343 which are mounted in slots 347 in the hinge plate 335, thereby rotating the hinge plate. The bolts 343 may be moved in the slots 347 to vary the amount of force required to open the door. Moving the bolts 343 to the left increases the required force, while moving the bolts to the right decreases the required force.

It will be appreciated that the door of FIG. 16 may be mounted in a shoot house in a variety of ways. The door frame may be bolted or otherwise attached to the walls of the shoot house. If the available opening is larger than the door frame, plate steel or other suitable material may be used to cover the space left between the opening and the door frame. Additionally, the door frame may be constructed to be the same size as wall panels or other pieces of the shoot house, allowing the door to easily fit inside of the shoot house. The door frame may also be provided with brackets which allow the door to be attached and secured to the floor, walls, ceiling, etc. of a shoot house.

The latch mechanism and related components shown in FIG. 16 may be used in combination with any of the door and door frame styles shown, and in combination with any of the hinges, sheeting, or containment frames shown. Thus, the latch mechanism should be considered as part of the other subassemblies and embodiments shown.

A significant advantage of the door shown in FIG. 16, and also of all of the doors shown and described in the present invention is that the door may be assembled as either a left or a right handed door. Such is not a significant concern where a training door is used as a stand alone exercise, but becomes important where a training door is used as part of a shoot house according to the present invention. According to the layout of the shoot house, or according to the specific desires of the persons in charge of the training, it may be desirable or necessary to have a door which opens outwardly or which opens inwardly, or which opens to the right or to the left.

As the doors of the present invention may be constructed with a piece of plate steel to which the desired hinges and latch mechanisms and other mechanisms may be attached, such mechanisms may be attached to either side of the door to form a left handed door or a right handed door. Alternatively, a person who has purchased a training door and desires a door which opens the opposite direction may simply disassemble the door and reassemble the door by placing the various parts on the opposite side of the door. It will be appreciated that, although not necessary, the ability to assemble a training door as a left or right handed door is aided by forming the various pieces as symmetrical pieces. It will be appreciated that the doors shown may each be assembled as a left or a right handed door.

Figure 17A:
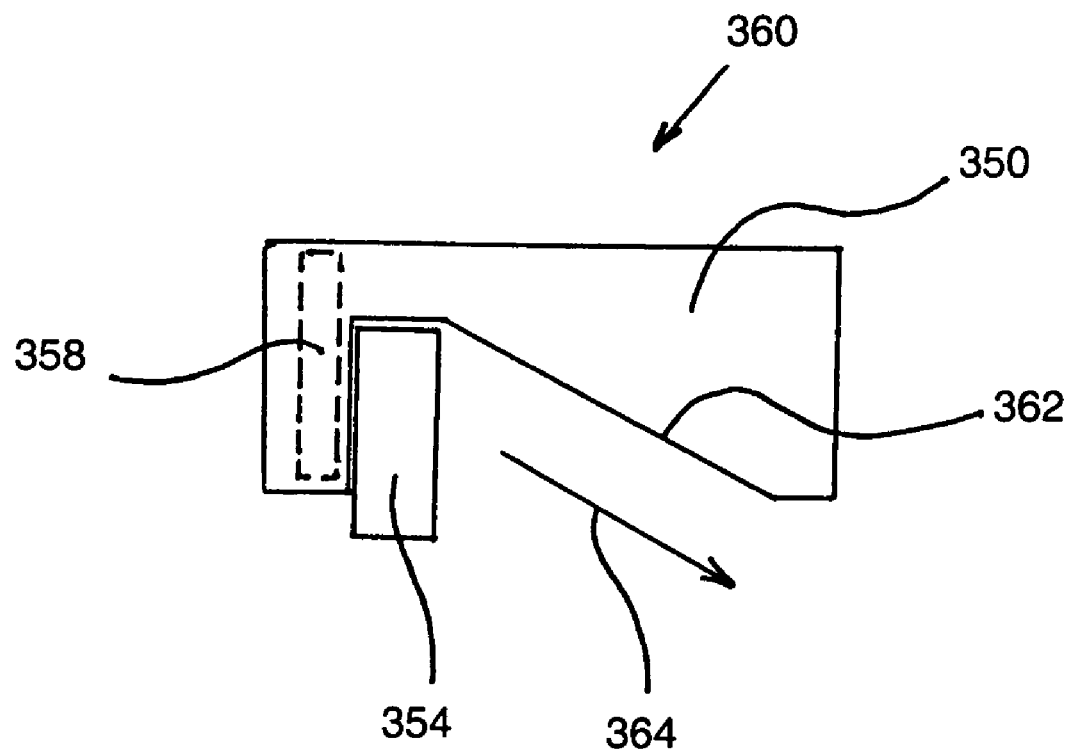
FIGS. 17a-17e show catch plates according to the present invention.

Turning now to FIGS. 17a-17e, a number of catch plates are shown as may be used with the latch mechanism shown in FIG. 16 (in place of catch plate 338). FIG. 17a shows a catch plate 350, the location of the second end of the lever 354 (similar to lever 278 of FIG. 16) in the latched position, and also shows where the catch plate would typically be attached to the hinge plate, indicated by dashed lines in area 358. As previously discussed, in releasing the door the hinge plate/catch plate assembly is pushed away from the door as indicated by arrow 360. As shown, this movement would move catch plate 350 to the left, relative to the lever 354. Thus, the lever 354 is slid along surface 362 of the catch plate 350 as indicated by arrow 364 until the lever no longer contacts the catch plate and the door is allowed to swing open. The spring attached to the lever 354 (spring 290 of FIG. 16) biases the end of lever 354 in an upward position. Accordingly, the spring resists the downward motion of the lever 354 which is necessary to release the catch plate 350 from the lever 354. The gently sloped surface 362 acts as a ramp, providing some resistance to opening the door, but a lesser amount of resistance. This may simulate a door which is easier to force open.

Figure 17B:
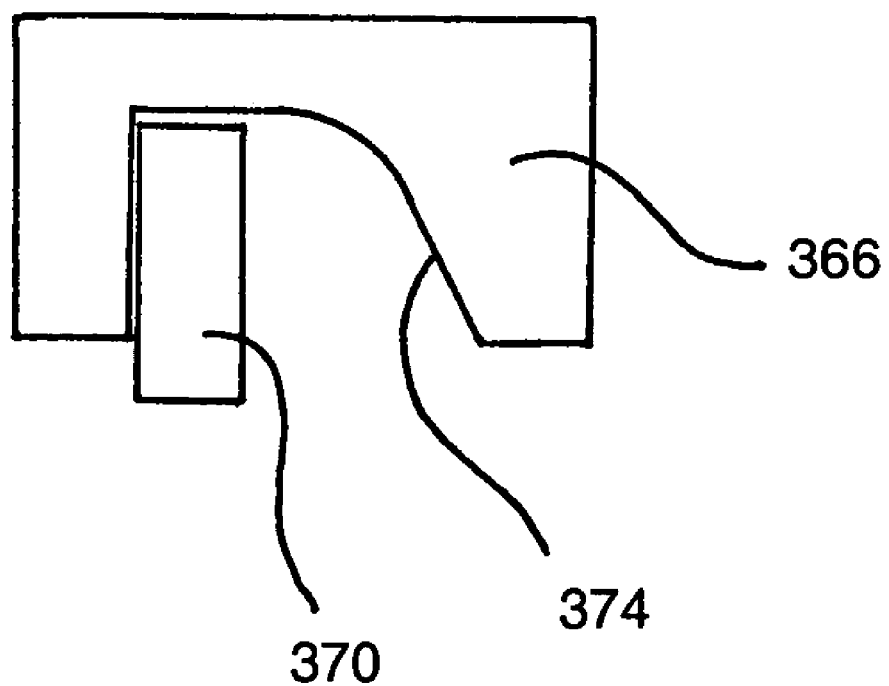

FIG. 17b shows another catch plate 366 and the position of lever 370 in the latched position, similar to the catch plate of FIG. 17a. It will be appreciated that as surface 374 is steeper, more perpendicular to the direction of movement of the lever, greater force is required to open a door having catch plate 366 than would be required to open a door having catch plate 350. Thus, catch plate 366 may simulate a door which is relatively difficult to open.

Figure 17C:
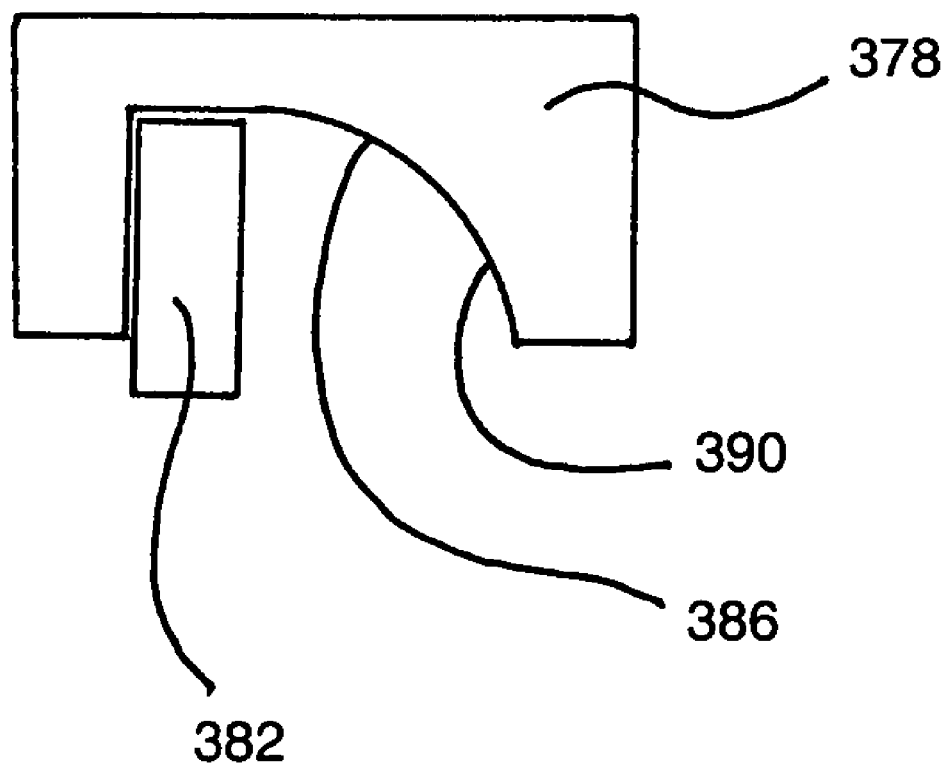

FIG. 17c shows another catch plate 378 and a lever 382 in a latched position. Surface 386, along which the lever must slide to release the catch plate 378 and lever 382, is a curved surface. The curved surface 386 would initially require less force be applied to the door to move the catch plate, but would require increasing amounts of force as the lever reaches the steeper portion 390 of the surface 386. Accordingly, catch plate 378 may be used to represent a door which yields to some force by moving slightly, but requires greater force to break open the door.

Figure 17D:
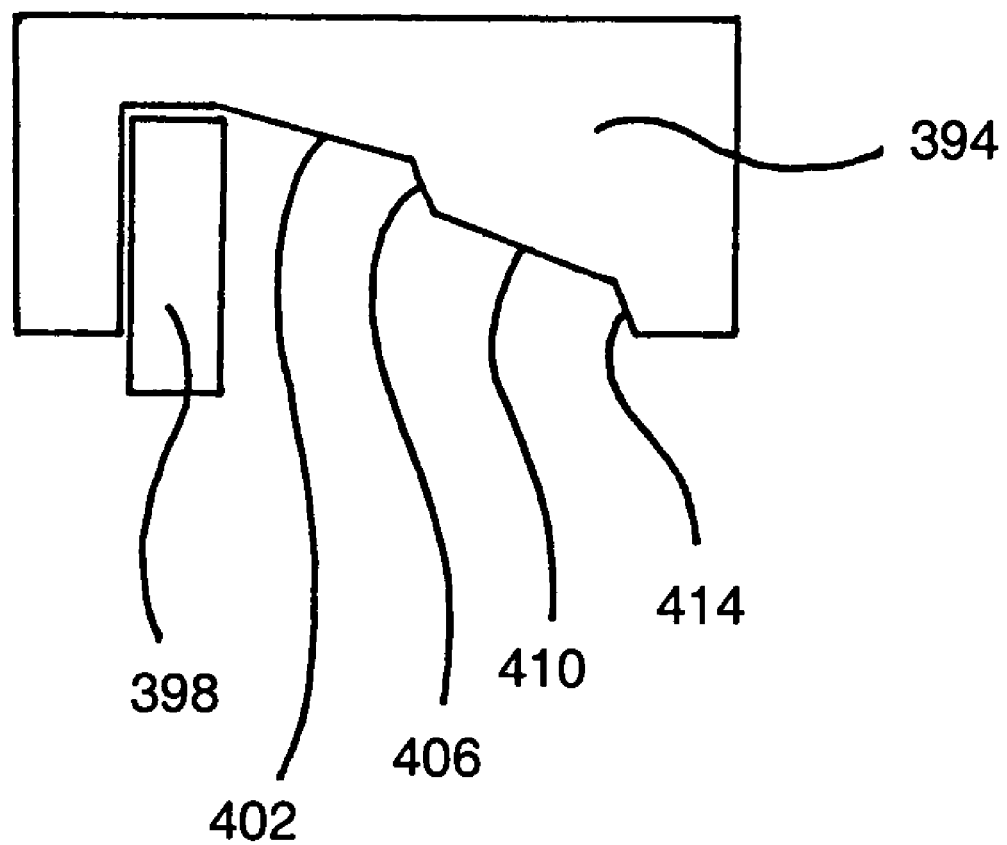

Turning to FIG. 17d, a catch plate 394 is shown with a lever 398 in a latched position. The catch plate 394 is formed with a stepped surface across which the lever must slide to release the catch plate and open the door. The stepped surface has a first surface 402, a second surface 406, a third surface 410, and a fourth surface 414, all of which are shown as relatively flat surfaces. The first and third surfaces 402, 410 have shallow slopes relative to the direction of movement of the catch plate 394 as the door opens (which is to the left) and thus allow the catch plate to move somewhat easily. The second and fourth surfaces 406, 414 have steeper slopes than the first and third surfaces 402, 410 and require greater force to slide the catch plate 394 relative across the lever 398 to open the door. Accordingly, a light push might move the lever 398 across the first surface 402 and to the second surface 406. A harder push on the door might move the lever 398 from the position shown past the first surface 402, second surface 406, and third surface 410, and leave the lever at surface 414, requiring another push to open the door. A very hard push might move the lever past all of the individual surfaces and open the door. Accordingly, a stepped catch plate 394 may be designed which requires a user to kick or otherwise force a door twice or more before it opens, simulating doors which are more difficult to open or which have multiple locks.

Figure 17E:
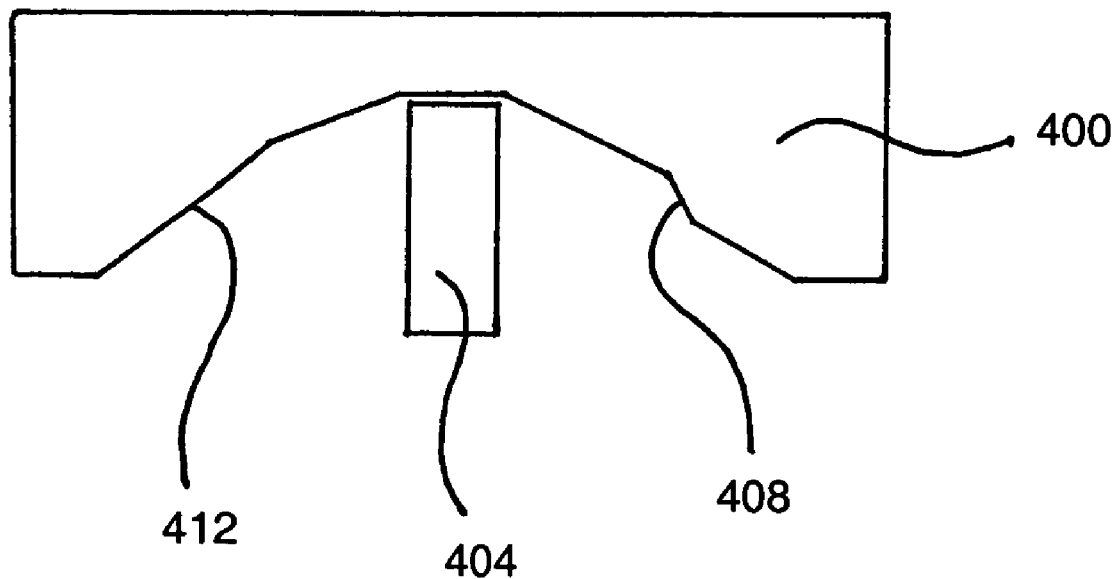

Turning to FIG. 17e, another catch plate according to aspects of the present invention is shown. The catch plate 400 is shown with a lever 404 in a latched position. The catch plate 400 has a stepped surface 408 along which the lever 404 may slide, similar to the stepped surface of catch plate 394 of FIG. 17d. Catch plate 400, however, is shown with a second stepped surface 412 along which lever 404 may slide. The two surfaces 408, 412 along which the lever 404 may slide may be formed symmetrically as shown, or may have differently shaped surfaces on each side. The catch plate 400 may be formed with two surfaces 408, 412 along which the lever 404 may slide to accommodate various different configurations of the hinge plate, lever, catch plate, etc. For different configurations of the door latch mechanism, the lever may slide across either or both sides of the catch plate as the door is opened. The catch plates shown may be used with a latch mechanism such as is shown in FIG. 16, and as such should be considered as part of the various door embodiments shown in other figures.

Figure 18A:
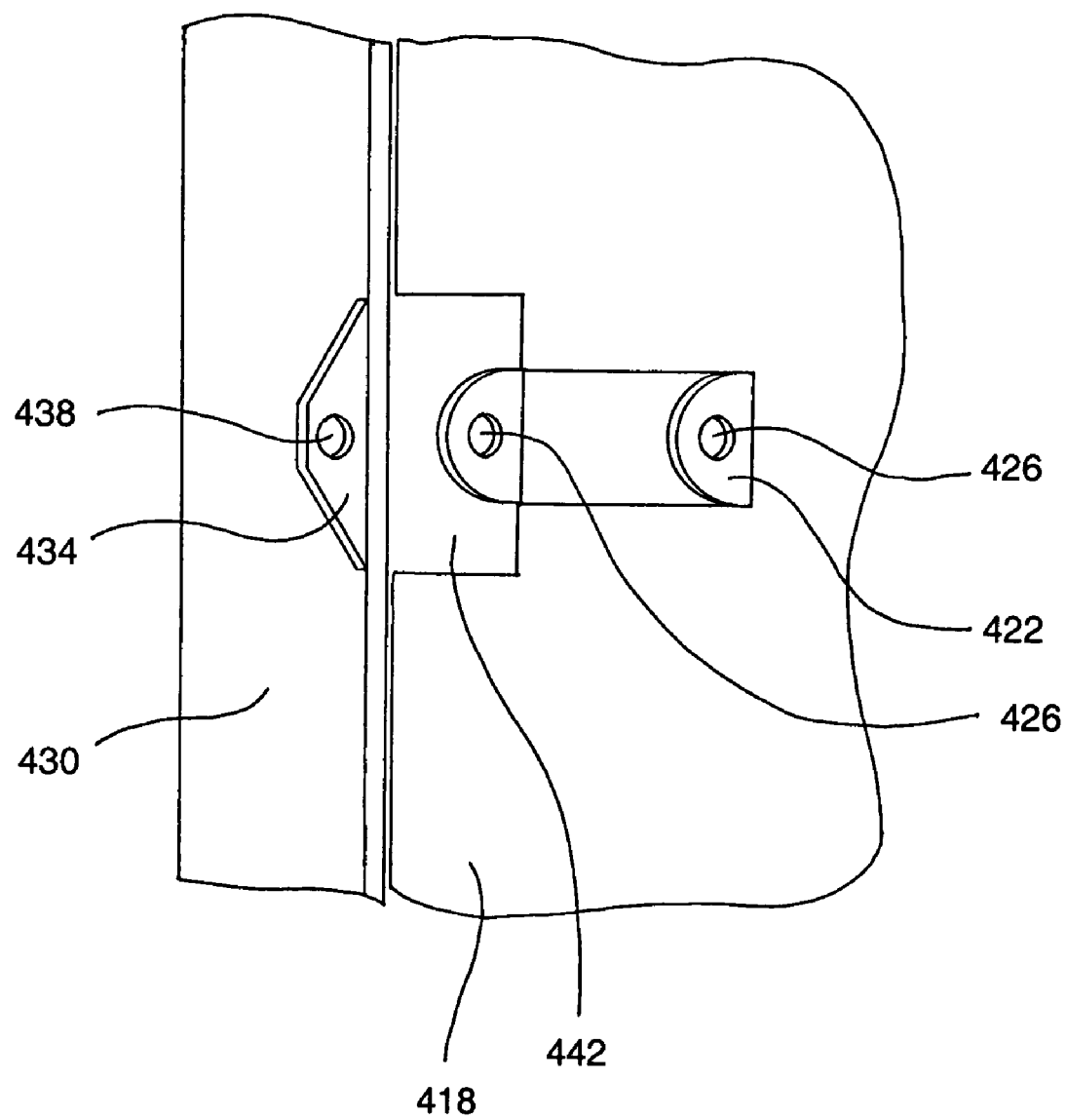
FIG. 18a shows a breakable latch mechanism according to the present invention.

Turning now to FIG. 18a, another door latch mechanism is shown. A bracket 422 is attached to the door 418, by welding, bolting, or any of many suitable methods. The bracket 422 has the two ends bent roughly perpendicular to the middle section, and has two holes 426 formed in the ends. The door jamb 430 has a bracket 434 with a hole 438 attached thereto. The hole 438 is in alignment with holes 426 so that a dowel or other rod like member may be placed through the three holes. The dowel or rod must then be broken to open the door. The holes 426, 438 are approximately ¾ inch in diameter, but are sized according to the breaking strength of the dowel and may range from approximately ⅜ inch to approximately 1 inch or more. A hole 442 is formed in the door which allows a trainee to shoot the dowel and thereby open the door. Dowels of sufficient thickness may be used such that the door may not easily be opened by kicking or applying force to the door, and the dowel must be shot or otherwise broken, representing doors which can not be kicked open and must be shot open. The catch mechanism may be used with any of the doors shown in the other figures, and should be considered as part of the various embodiments of the invention.

Figure 18B:
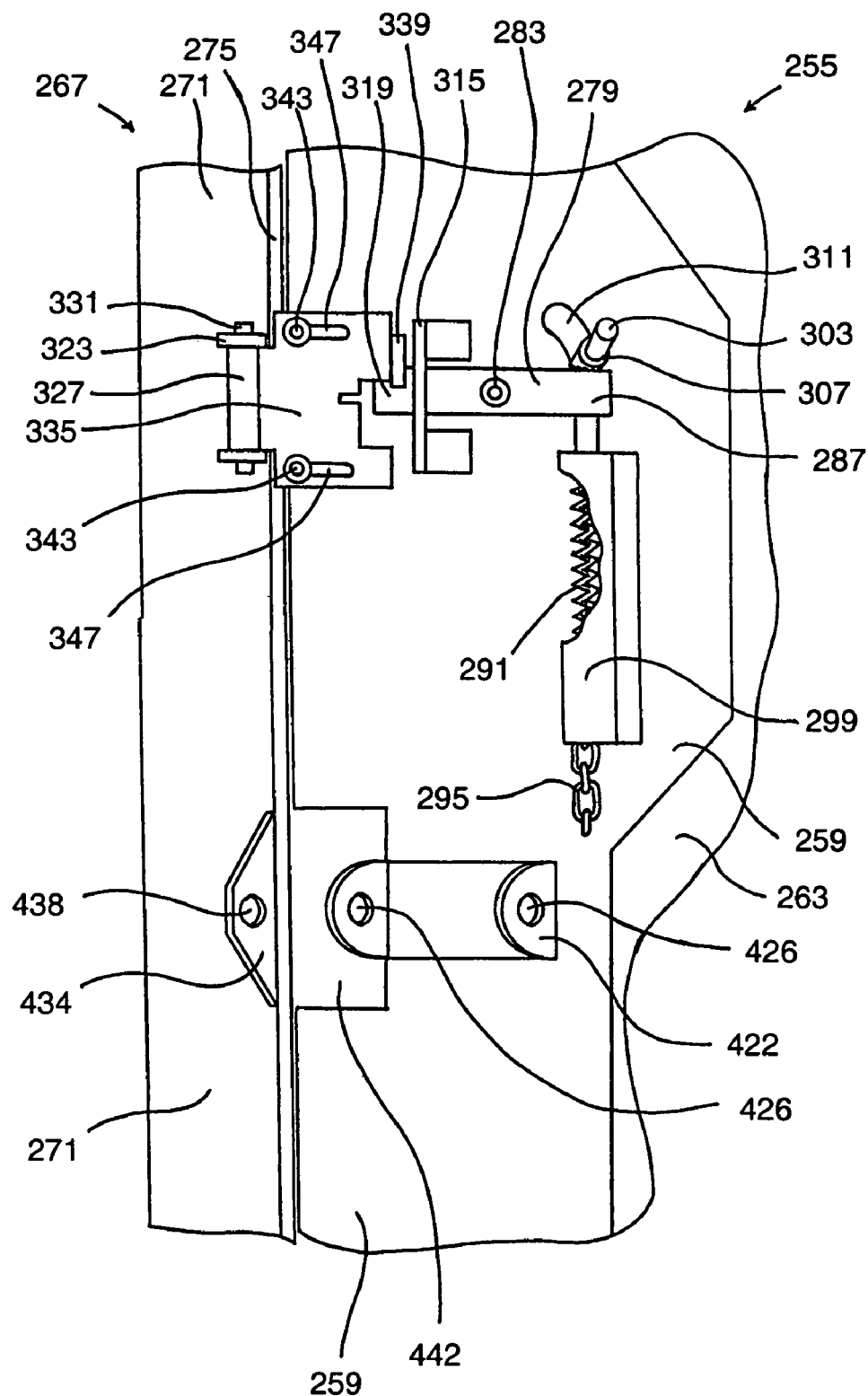
FIG. 18b shows another door having multiple latch mechanisms according to the present invention.

Turning now to FIG. 18b, another door according to the present invention is shown. The door, indicated generally at 255, may be formed of a steel plate frame 259 with a covering 263, such as plywood, or may be formed as a continuous steel plate with or without a covering. The door 255 includes both the latch mechanism shown in FIG. 16 and the latch mechanism shown in FIG. 18a, and uses the same numbers accordingly. For a detailed description of the various parts and operation of the latch mechanisms, refer back to the discussion of FIG. 16 and FIG. 18a. FIG. 18b illustrates how, according to aspects of the present invention, a training door may comprise multiple latch mechanisms.

The use of multiple latch mechanisms on a single training door provides various benefits. The door 255 provides greater flexibility in operation, as either or both of the latch mechanisms may be used for training. Thus, a door may be provided which requires a person to shoot or blast out one mechanism, and then kick or smash open the door to overcome another latch mechanism, simulating higher security doors. The door shown in FIG. 18b. further illustrates the interchangeability of the various subassemblies and mechanisms of the present invention to provide a training door which is suited to the desired training scenarios.

Figure 19:
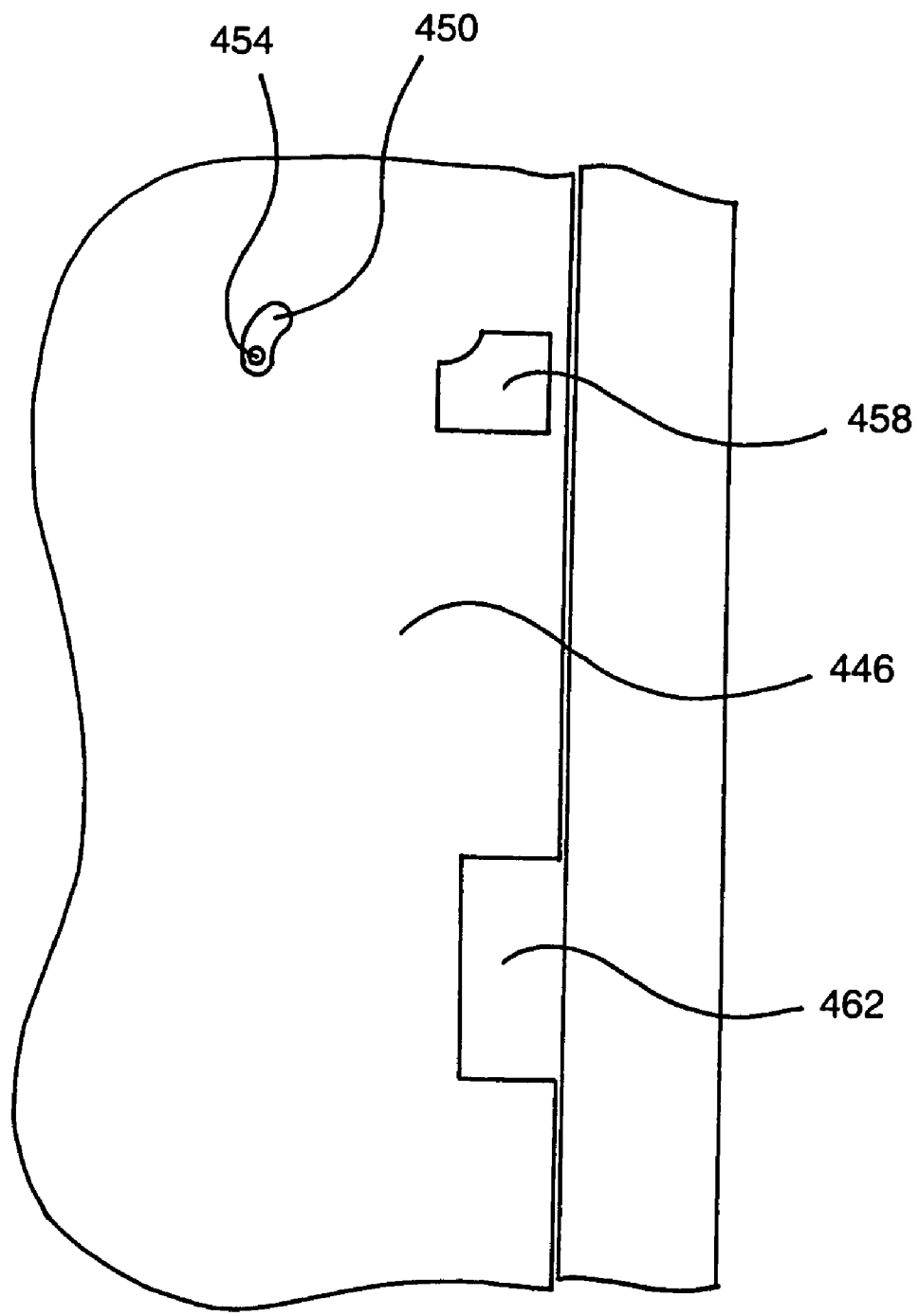
FIG. 19 shows a door according to the present invention.

Turning now to FIG. 19, a view of a door is shown from the perspective of a person opening the door. The door 446 has been covered with plywood, which is visible to the person opening the door. The person opening the door 446 is not able to see the latch mechanisms which are holding the door closed, and can not determine in advance how to best open the door. Several holes may be formed in the door and plywood as desired. Hole 450 allows access to a rod 454 (similar to rod 302 of FIG. 16) which may be used to unlatch the door without applying force to the door if such is necessary. Hole 458 allows a person to place an elongate tool having a hooked end through the hole to thereby close the hinge plate/catch plate (334, 338 of FIG. 16) after closing the door. Thus, hole 458 allows a person to close and latch a door 446 from either side of the door. Hole 462 is similar to hole 442 of FIG. 18, through which a trainee would shoot out a dowel which is holding a door shut if required. In such a training exercise, a piece of plywood, sheetrock, hardboard, etc. may be used to cover the hole. Covering the hole would prevent a trainee from immediately recognizing what is necessary to open the door, and may thus be desirable as the training may be more realistic.

It will thus be appreciated that a door may have multiple latch mechanisms built into the door. Having multiple latch mechanisms adds flexibility to the door, allowing a door to be held shut in a variety of different manners and requiring different techniques to open the door. For example, a trainee might try to kick open a door, discover that it will not open by kicking, shoot out the dowel holding the door closed, and then kick open the door. This would be similar to a real door which will not kick open, requiring an officer to shoot the door around the lock to thereby weaken the door and then kick in the door.

Figure 20:
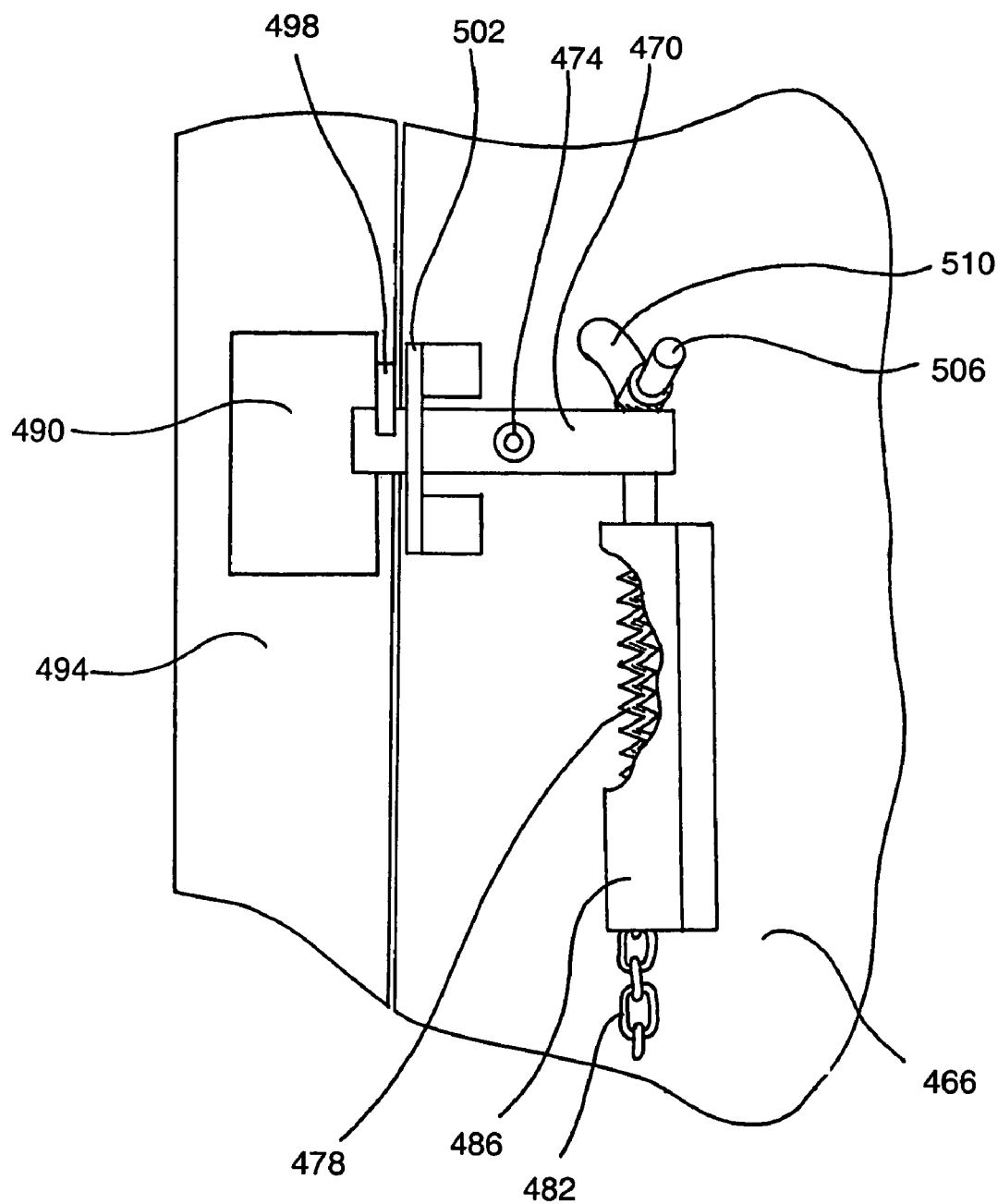
FIG. 20 shows a door latch mechanism according to the present invention.

Turning now to FIG. 20, another door 466 and latch mechanism according to aspects of the present invention is shown. A lever 470 is attached to the door 466 with a bolt 474, which forms a pivot for the lever. The right end of the lever is attached to a spring 478 which is in turn attached to some chain 482. The spring 478 is covered by a guard 486 which has a Z shaped cross section, allowing it to be attached to the door and bend outwardly and around the spring. The guard 486 also has a slot at the bottom for securing the chain and holding tension in the spring 478. A link of the chain 482 is simply placed into the slot. The spring 478 biases the lever 470 to rotate to the right, raising the left side of the lever. The left side of the lever 470 engages a catch mechanism 490 which is mounted to the doorjamb 494.

The catch mechanism 490 (which may be integral to the door frame) has a catch plate 498 which extends outwardly from the doorjamb 494, and may be attached to the catch mechanism, or may be formed as a single piece with the catch mechanism. The catch plate engages the lever 470 and inhibits movement of the lever 470. To open the door, force may be applied to the door to force the lever to slide out of engagement of the catch plate 498. A guide bracket 502 may be attached to the door 466, forming a channel around the lever 470 and thereby preventing the lever from moving in a manner which is not desired. Additionally, an arm 506 may be attached to the lever 470 and extended at least partially through an opening 510 in the door 466 to allow a person to open the door without forcing the door, if necessary.

Figure 21:
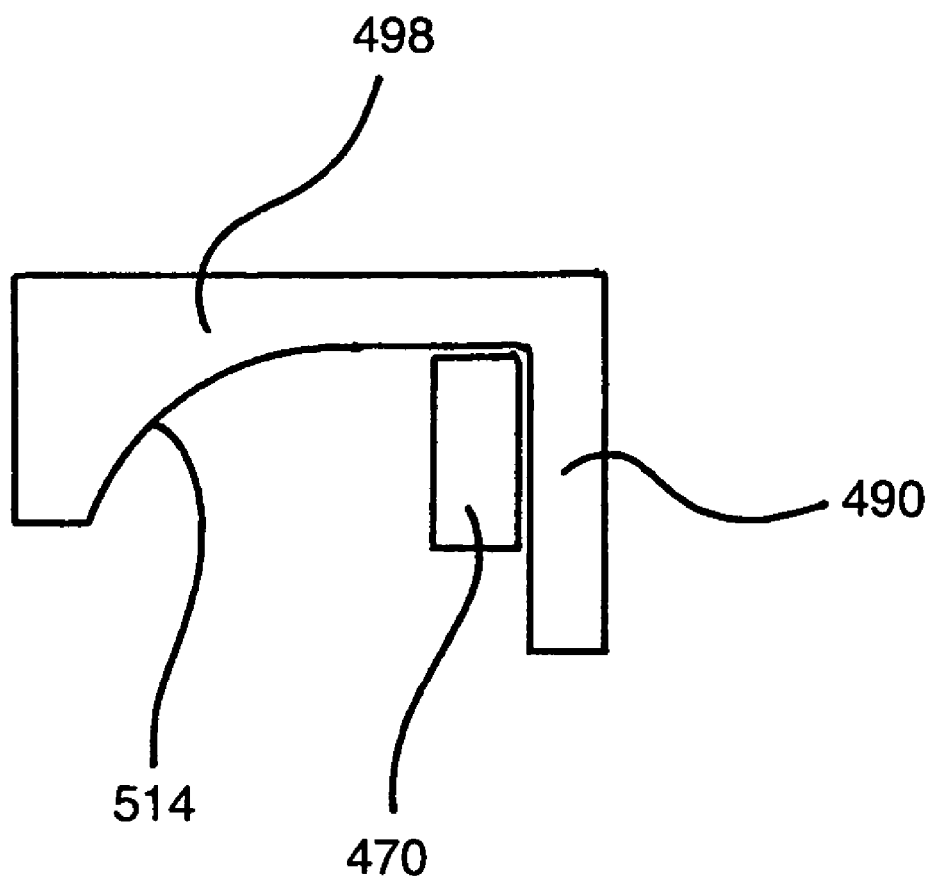
FIG. 21 shows a catch mechanism according to the present invention.

Turning now to FIG. 21, a side view of the catch mechanism 490 of FIG. 20 is shown. The catch plate 498 extending from the catch mechanism 490 is more clearly visible. The lever 470 is shown in a latched position. To open the door, the lever must be forced to the left, sliding across the lower surface 514 of the catch plate 498. As the lever 470 slides to the left, it is forced to rotate so that the end of the lever may move downwardly, which is opposed by the spring (478 of FIG. 20). Accordingly, sufficient force must be exerted to overcome the spring and open the door. It will be appreciated that surface 514 may also be formed in a similar manner to the catch plates shown in FIGS. 17a-17e with similar advantages. The latch mechanism shown in FIGS. 20 and 21 may be used in combination with any of the doors shown, and thus should be considered as part of those embodiments.

Figure 22:
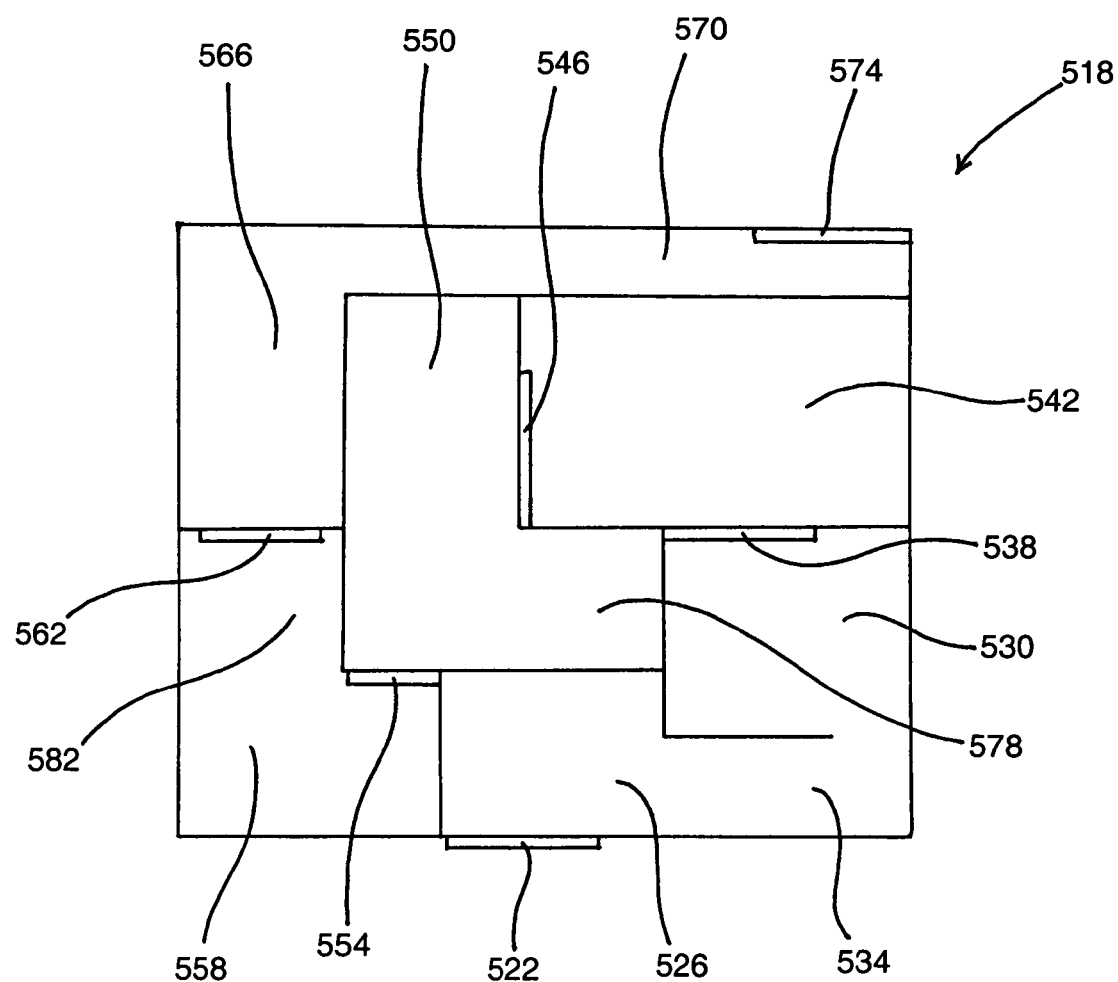
FIG. 22 shows a top view of a shoot house utilizing training doors according to the present invention.

Turning to FIG. 22, a shoot house, indicated generally at 518 is shown. The shoot house 518 is constructed with a front door 522 which leads into the first room 526 of the shoot house. The first room 526 is connected to a second room 530 via hallway 534. A second door 538 opens into room 542. Similarly, doors 546, 554, 562, rooms 550, 558, 566, hallway 570, and exit door 574 are arranged to form a completed shoot house.

According to the present invention any or all of the doors may be replaced with training doors. The various training doors used may be chosen so as to match the different types of doors which would be found in a building, and the shoot house may thus be used to simulate a particular type of building or a particular scenario which the trainee would likely encounter outside of training. The front door 520 may thus be a training door which requires a trainee to both shoot out a lock or portion of the door and then kick the door open, representing a strong exterior door or security door. Inner doors 538, 546, 554, 562 may be training doors which require the trainee to kick open the door, shoot and kick the door, etc. as is desired for a particular training scenario. It may be desirable to make some doors more difficult to enter than others, simulating a higher security room. It may also be desirable to make some doors which are easier to open, requiring little force or effort, simulating rooms of lower importance or security, such as closets.

Accordingly, a shoot house may be constructed to realistically simulate a variety of scenarios. For example, the shoot house may be configured to simulate a drug bust or raid. Accordingly, trainees may be required to break through the various doors and enter the various areas of the shoot house to check and secure the area. Trainees may be required to perform certain techniques, such as room clearing or securing techniques, in combination with breaking into the room. For example, door 538 leads into a room 542 which is open on both sides, door 546 leads into a room 550 which is open to the left and which has a small hidden area 578, and door 554 opens into a room 588 which is open to the right and which has a larger hidden area leading to another door 562. Accordingly, trainees would be required to use different techniques in breaking through doors 538, 546, and 552, and securing rooms 542, 550, and 558.

The present invention thus provides a significant advantage as a trainee or group of trainees practice techniques to break through various different doors and secure different shapes and sizes of rooms. As is known in the prior art, trainees practicing door entry techniques may simply kick open a door which has been erected independent of any related structure, such as an adjacent room. The trainee is not immersed in a training scenario, but simply kicks open a door and stops. For training scenarios when a trainee or group of trainees is required to secure a room, the trainees may simply enter a room having no door at all, move to the appropriate locations in the room, and be finished with the exercise.

It is easily appreciated how the present invention provides a much more realistic and beneficial training environment. A trainee is immersed in a training environment before encountering a training door. The trainee may have encountered targets or other devices which better simulate the training scenario. When trainees must secure a room, they may be first required to break through the door. The momentum of breaking through the door will make it more challenging to quickly and properly secure the room and will more realistically simulate a real scenario. Additionally, the trainees may encounter smoke, targets, or other objects which are possible inside of a shoot house. The present invention allows trainees to practice training procedures in a more realistic environment and in the context of a larger training scenario.

A shoot house may thus be used to simulate a variety of situations. Trainees may be required to check and secure a building while looking for hostages. According to the present invention, the trainees may encounter training doors in the larger shoot house environment which may include live ammunition, targets, moving targets, smoke, a realistic building environment, etc. It will be appreciated that any number of different scenarios may be realistically simulated.

Training doors according to the present invention may be accommodated to a large variety of different shoot house designs. For shoot houses constructed with steel panels, the training door may be made with a doorjamb that is the same size as the steel wall panels and thus fits easily into the shoot house structure. If the opening in the shoot house is larger than the door jamb, a plate may be provided which extends between the opening and the jamb and covers the gap, preferably preventing any bullets from passing through the plate. If the shoot house is formed from concrete, gravel filled walls, etc. a bracket may be provided which has a flange or surface configured for attachment to the shoot house walls, typically by bolting, screwing, or otherwise fastening the bracket. The bracket will also typically extend outwardly from the shoot house wall sufficiently to attach to the door jamb/frame and fill any gap between the door jamb and the shoot house wall, and will have a surface for attachment to the door jamb. The bracket may typically have holes formed therein for use in attaching the bracket to the shoot house wall and to the door jamb, and the door jamb may be formed with holes for attachment to the bracket.

Thus, doors may be constructed according to any combination of the aspects of the invention shown in the various figures and drawings to adapt to a variety of shoot houses or training scenarios, and to provide the desired type of door entry or level of security.

Figure 23:
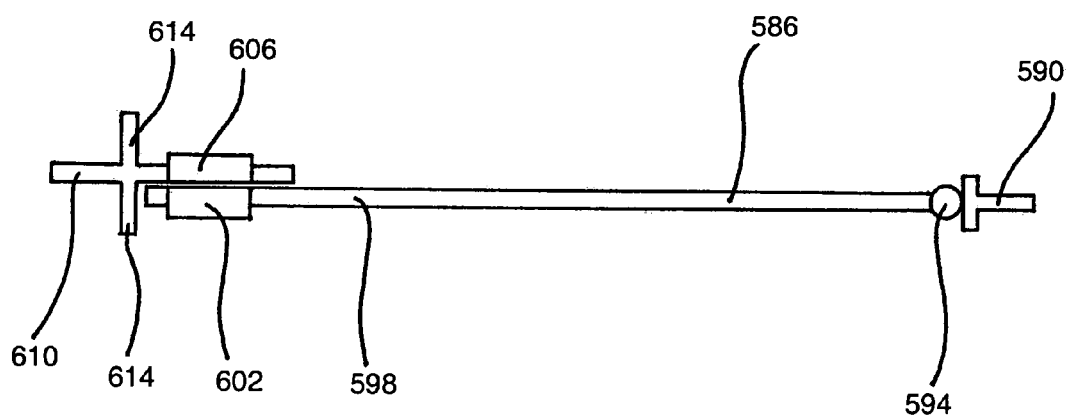
FIG. 23 shows a top view of a magnetic training door according to the present invention.

Turning now to FIG. 23, a top view of another training door according to the present invention is shown. The door 586 may be formed from many materials such as steel, plywood, wood, plastic, etc. or a combination of materials. On one side of the door 586, the door has been attached to a door frame 590 via at least one hinge 594. The hinge should allow the door to pivot freely, and should be sufficiently strong to withstand the force of the forced entry training procedure. The door frame or doorjamb 590 is shown as a T shaped member to add rigidity to the door frame. The T may be formed by welding two flat pieces of steel together, or by simply using T shaped material. It will be appreciated, however, that many different shapes and types of material are suitable for the door frame 590.

The free end 598 of the door 586 has been formed with a magnetically interactive latch member 602 which is configured to interact with a magnetic catch 606 on the door frame 610. Although not necessary in all applications, the door frame 610 is shown with flanges 614 which are used to strengthen the frame 610. Many different configurations of magnetically interactive latch members 602 and catch members 606 are possible. For example, a permanent magnet may be used for latch 602 and an electromagnet may be used for catch 606. Alternatively, the combination may consist of two permanent magnets, two electromagnets, or a magnet and a piece of magnetically interactive metal such as iron. It is also possible to form the door end 598 or door frame 610 out of a magnetically interactive metal and use a magnet on the complementary surface. The force necessary to open the door may be varied by varying the strength of the magnet used in the magnetic catch system shown. Additionally, if an electromagnet is used in combination with either a permanent magnet or magnetically interactive metal, the force required to open the door may be adjusted at any time by varying the current flowing through the electromagnet.

Figure 24:
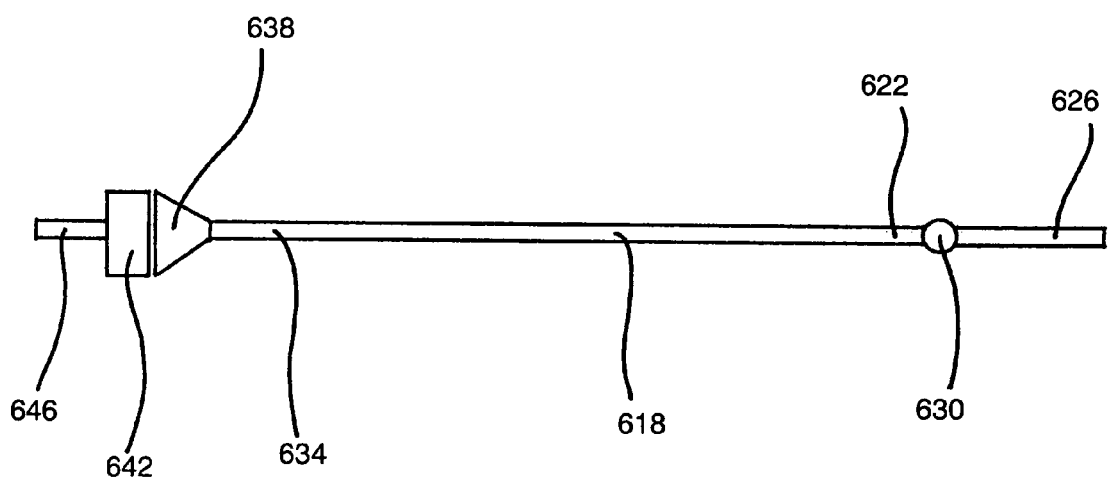
FIG. 24 shows a top view of another magnetic training door according to the present invention.

Turning now to FIG. 24, a top view of another door is shown. The door 618 has a first end 622 attached to a door frame 626 via a hinge 630. The second end 634 of the door 618 is formed with a magnetically interactive latch 638. A corresponding magnetically interactive catch 642 is formed on the door frame 646. The magnetic catch mechanism of FIG. 23 uses the overlapping engagement of the magnetic catch parts to close the door wherein the magnets must be pulled directly away from each other, providing a strong magnetic interaction. The magnetic catch mechanism of FIG. 24 does not pull directly away, but each half of the mechanism slides sideways relative to the other half of the mechanism, requiring stronger magnetic force to provide the same resistance to opening the door. Advantageously, the door of FIG. 24 may be opened in both directions, while the door of FIG. 23 may only be opened in one direction.

Figure 25:
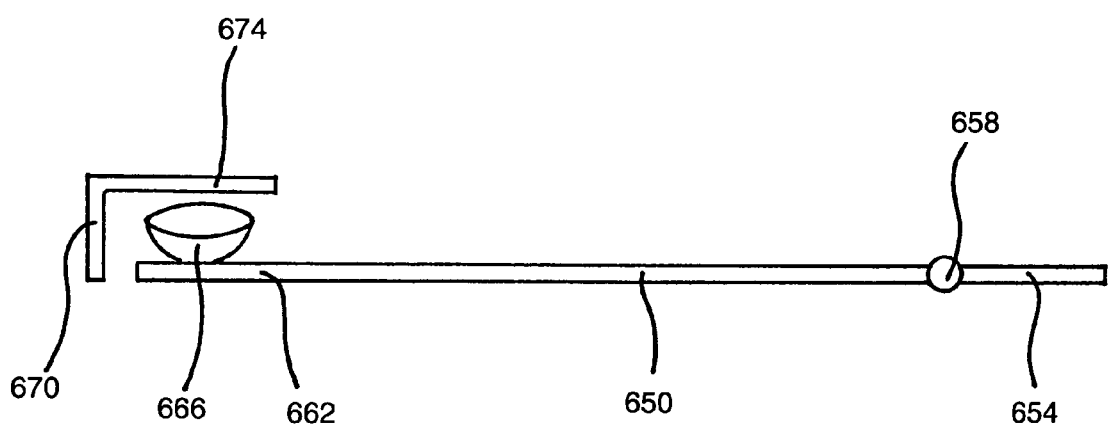
FIG. 25 shows a top view of a suction actuated training door according to the present invention.

Turning now to FIG. 25, a top view of a door according to the present invention is shown. The door 650 is attached to a door frame 654 with a hinge 658. The free end 662 of the door 650 has a suction cup 666. The door frame 670 adjacent the free end 662 of the door 650 is formed with a surface 674 which is configured for engaging the suction cup 666. The suction cup 666 and engaging surface 674 are configured for holding the door 650 closed until sufficient force is applied to the door. The force required to open the door may be varied by varying the number and type of suction cups.

The latch mechanisms shown in FIGS. 23-25 may be used in combination with any of the doors shown, and should be considered as part of those embodiments of the invention.

Figure 26:
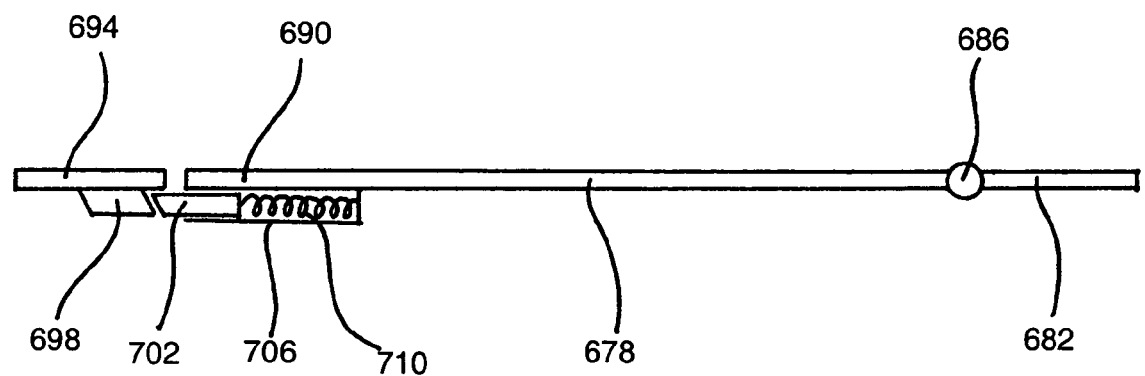
FIG. 26 shows a top view of a piston latch training door according to the present invention.

Turning now to FIG. 26, a top view of another door and latch mechanism according to the present invention is shown. The door 678 is attached to a door frame 682 with a hinge 686. The free end 690 of the door 678 and the corresponding door frame 694 are fitted with a piston type latch mechanism. The latch mechanism uses a receiving member 698 and a piston 702 to hold the door closed. A guide 706 limits the movement of the piston 702 and a biasing element 710, such as a spring, urges the piston 702 against the receiving member 698.

Figure 27:
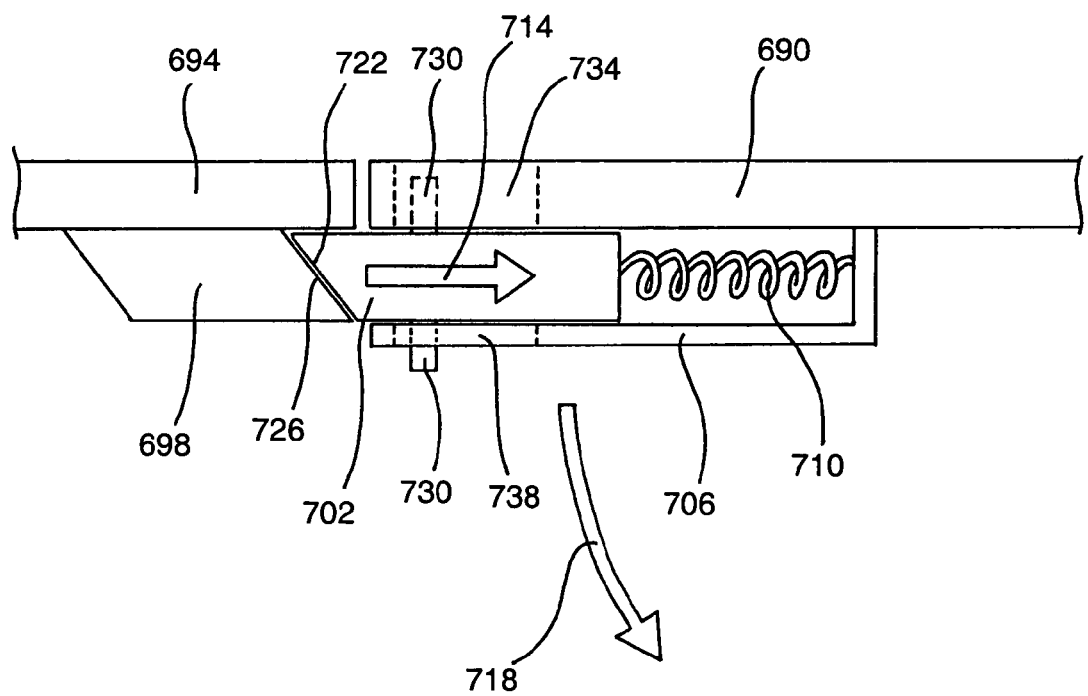
FIG. 27 shows a top view of the latch mechanism of the training door of FIG. 26.

Turning to FIG. 27, a closer top view of the latch mechanism of FIG. 26 is shown. The door 690 is shown in a closed position relative to the door frame 694. Accordingly, the piston 702 is shown in a position whereby the piston engages the receiving member 698 to maintain the door 690 in a closed position. Guide 706 is used to substantially limit the motion of the piston to linear movement in the direction of arrow 714. Accordingly, the guide 706 will preferably inhibit movement of the piston away from the door and up and down along the surface of the door, limiting the movement back and forth as indicated by arrow 714. A biasing element 710 is used to bias the piston 702 against the receiving member 698. The biasing element 710 may be a spring as shown, or may be any number of different biasing elements such as an elastomeric member.

In order to force the door 690 open, force is exerted on the door 690 to move the door in the direction of arrow 718. The piston 702 resists the movement of the door 690 as the piston 702 must move in the direction of arrow 714 to allow the door 690 to open. Accordingly, the angle of sloped engaging surface 722 and corresponding surface 726, and the force applied by biasing element 710 primarily determine how much force must be exerted to open the door 690. The piston 702 may also be provided with projections 730 which may extend at least partially into slots 734, 738 formed into the door 690 or guide 706. The projections 730 and slots 734, 738 allow a user to open the door without forcing the door or to close the door and reset the mechanism for subsequent use from either side of the door. The catch mechanism shown in FIGS. 26 and 27 may be used with any of the door styles, and should be considered as part of those embodiments.

In discussing the present invention, it will easily be appreciated that many different types of training doors are possible by varying the hinges, latches, destructible portions, coverings or containment structures, etc. of the door, and by varying the frame, if any, which is used with the door. Thus, a training door of the present invention may be constructed with the desired components so as to require a certain forced entry technique or combination of forced entry techniques, and to require a particular level of force. As such, the invention has been described by describing the individual subassemblies of the invention, such as latch or hinge mechanisms, containment chambers, etc. Description of the various subassemblies of the invention separately allows for greater clarity in discussing the functionality of each subassembly. The invention encompasses all of these subassemblies as they may be combined to form a desired type of training door.

There is thus disclosed an improved door for ballistic training. It will be appreciated that numerous modifications may be made to the present invention without departing from the scope of the invention. The preceding examples are illustrative of the invention, and do not define the scope of the invention.

What is claimed is:

1. A training door for use in a ballistic environment comprising:
   a door;
   a lever attached to the door;
   a catch plate;
   a biasing element attached to the lever and configured for applying force to the lever to bias the lever against the catch plate and thereby hold the door closed; and
   wherein the door may be opened by applying sufficient force to the door to thereby remove the lever from engagement with the catch plate.

2. The training door of claim 1, further comprising a door frame and a hinge plate pivotally attached to the door frame and wherein the catch plate is attached to the hinge plate.

3. The training door of claim 1, wherein the door further comprises a hole and wherein the lever further comprises an arm extending at least partially through the hole, the arm configured for moving the lever.

4. The training door of claim 1, further comprising a channel for limiting the range of movement of the lever.

5. The training door of claim 4, wherein the channel is formed by attaching a guide piece to the door.

6. The training door of claim 1, wherein the force exerted on the lever by the biasing element is adjustable to adjust the force required to open the door.

7. The training door of claim 2, wherein the hinge plate further comprises at least one contact point which contacts the door when the door is opened.

8. The training door of claim 7, wherein the contact point is attached to a slot and wherein the contact point is movable along the slot to vary the force required to open the door.

9. The training door of claim 2, wherein the door further comprises an opening configured for moving the hinge plate from the side of the door opposite the hinge plate.

10. The training door of claim 1, wherein the biasing element is a spring.

11. The training door of claim 1, wherein the door is formed from bullet proof plate steel.

12. The training door of claim 1, wherein the door is generally bullet proof.

13. The training door of claim 1, wherein the door comprises a door frame which is generally bullet proof.

14. The training door of claim 1, wherein the door comprises a door frame, and wherein the catch plate is attached to the door frame.

15. The training door of claim 1, wherein the lever is removed from engagement with the catch plate by sliding the lever across a surface of the catch plate.

16. The training door of claim 15, wherein said surface is sloped to resist sliding of the lever across said surface.

17. The training door of claim 15, wherein said surface comprises a first sloped section providing a first resistance to sliding movement of the lever and a second sloped section having a slope different than the first section and providing a second resistance to sliding movement of the lever different than the first resistance to sliding.

18. The training door of claim 15, wherein said sliding surface comprises a curved surface so as to provide varying resistance to sliding movement of the lever as the lever slides across the surface.

19. The training door of claim 1, further comprising:
   a door frame;
   a door bracket attached to the door;
   a frame bracket attached to the door frame; and
   a breakable member connecting the door bracket to the frame bracket.

20. The training door of claim 19, wherein the breakable member is selected from the group consisting of bolts, dowels, wire, plastic rods, plastic, cable ties, and wire ties.

21. A system comprising the training door of claim 1, and further comprising a plurality of bullet proof walls forming a shoot house.

22. A forced entry training door comprising:
   a door frame;
   a door formed from bullet resistant plate steel and attached to the door frame with hinges;
   a latch member movably attached to the door;
   a catch member; and a biasing element configured for urging the latch member into engagement with the catch member so as to hold the door closed.

23. The training door of claim 22, wherein the latch member is linearly slidable.

24. The training door of claim 23, further comprising a guide to limit the movement of the latch member.

25. The training door of claim 23, wherein an end of the latch member is angled and wherein the catch member has an angled mating surface for engagement with the latch member.

26. The training door of claim 22, further comprising a projection for moving the latch member.

27. The training door of claim 22, wherein the catch member is disposed on the door frame.

28. The training door of claim 22, wherein the latch member is disposed on the door.

29. The training door of claim 22, wherein the latch member is pivotable.

30. The training door of claim 29, wherein opening the door forces the latch member to slide across a surface of the catch member and thereby pivot the latch member against the bias of the biasing element.

31. The training door of claim 22, wherein the catch member is attached to the door frame via a lever.

32. The training door of claim 31, wherein opening the door releases the latch member from the catch member and causes the lever to pivot away from the door.

33. A training door comprising:
a reusable training door; and
a releasable closure mechanism configured for holding the door closed until the door is opened by at least one technique selected from the group consisting of kicking, ramming, impacting, shooting, blasting, and prying thereby releasing the releasable closure mechanism; and
wherein the closure mechanism is configured for reuse without replacement of consumable materials.

34. The training door of claim 33, wherein the closure mechanism comprises:
a latch member;
a catch member; and
a biasing element for urging the latch member into engagement with the catch member and holding the door closed.

35. The training door of claim 33, further comprising a second closure mechanism.

36. The training door of claim 35, wherein the second closure mechanism comprises a durable mechanism with a breakable component, and wherein the breakable component is replaceable for reuse.

37. The training door of claim 36, wherein the breakable component is selected from the group consisting of bolts, dowels, wire, plastic rods, plastic, cable ties, and wire ties.

38. The training door of claim 34, further comprising a door frame, and wherein one of the latch member and catch member is disposed on the door frame and the other of the latch member and catch member is disposed on the door.

39. The training door of claim 33, further comprising a door frame.

40. The system of claim 39, wherein the bullet proof walls comprise steel plates and wherein the edges of the door frame comprise steel plate of thickness comparable to the bullet proof walls, and further comprising a facing strip, backing means, and bolts to attach the door frame to the bullet proof walls.

41. The training door of claim 33, wherein the door is assembled with the closure mechanism on the left side of the door or on the right side of the door so as to form a left handed or a right handed door.

42. The training door of claim 1, wherein the lever, catch plate, and biasing element are removably attached to the door, and wherein the lever, catch plate, and biasing element may be alternatively attached to either side of the door so as to form a left or a right handed door.

43. The training door of claim 22, wherein the latch member, catch member, and biasing element are removably attached to the door, and wherein the latch member, catch member, and biasing element may be alternatively attached to either side of the door so as to form a left or a right handed door.

44. A forced entry training door comprising:
a generally bullet proof door;
a reusable closure mechanism releasably attachable to the door and configured for holding the door closed until sufficient force is applied to the door;
wherein the door comprises an access through which the reusable closure mechanism may be accessed as an alternative to use of a force to open the door; and
wherein the closure mechanism is attached to the left side of the door or to the right side of the door so as to form a left or a right handed door.

45. A method of simulating a forced entry through a door comprising:
selecting a door through which forced entry is made;
holding the door closed with a reusable latch mechanism which holds the door closed until a force in excess of a predetermined threshold is applied to the door and thereby causes the latching mechanism to release the door; and
wherein the door comprises an access point through which the reusable latch mechanism may be accessed as an alternative to use of a predetermined force to open the door.

46. The method of claim 45, wherein entry is made without appreciable damage to the latching mechanism.

47. The method of claim 45, wherein the latching mechanism comprises a magnet.

48. The method of claim 45, wherein the latching mechanism comprises a lever.

49. The method of claim 45, wherein the latching mechanism comprises suction.

50. The method of claim 45, wherein the latching mechanism comprises a sliding pin.

51. The method of claim 45, wherein the door is disposed inside of a ballistic shoot house.

52. A method of simulating a forced entry through a door comprising:
selecting a door through which forced entry is made;
holding the door closed with a reusable latch mechanism which holds the door closed until a force in excess of a predetermined threshold is applied to the door and thereby causes the latching mechanism to release the door; and
wherein the door is formed from steel plate and comprises at least one opening which is covered with a destructible material, and wherein entry is made by breaking the destructible material.

53. The method of claim 52, wherein breaking the destructible material separates a hinge or latch mechanism from the door.

54. The method of claim 45, wherein the latch mechanism comprises a door bracket and a door frame bracket which are connectable by a fastener, and whereby opening the door breaks the fastener.

55. The training door of claim 1, wherein the door comprises a hole allowing access to the biasing element during setup.

56. The training door of claim 1, wherein the door is symmetrically constructed such that it may be configured as right or left-handed.

57. The training door of claim 1, wherein the door is symmetrically constructed such that it may be configured to swing inward or outward.

58. The training door of claim 22, wherein the door is removably attached to the door frame.

59. The method of claim 45, further comprising the steps of:
removing the door after use;
replacing the door with an alternate door prior to the next use.

60. The method of claim 59, further comprising the step of preparing the door for subsequent use, including repair of any damage to the door, during the period of use of the alternate door.

61. The training door of claim 22, wherein the door further comprises an access to undo the latch member as an alternative to use of a predetermined force to overcome the biasing element.

62. The training door of claim 33, further comprising a bullet containment frame.

63. The training door of claim 62, wherein the bullet containment frame comprises a sheet of bullet penetrable material attached to the door.

64. The training door of claim 63, wherein the sheet is attached to the door so as to form a space between the bullet proof plate and the sheet.

65. The training door of claim 63, wherein the sheet is attached to the door via wood strips.

66. A system comprising the training door of claim 39 and comprising a plurality of bullet proof walls forming a shoot house.

67. The training door of claim 39, wherein the door is attached to the door frame via hinges.

68. The training door of claim 67, wherein the hinges comprise a pin and a socket, and wherein the door may be lifted off of the door frame without tools.

69. The training door of claim 39, wherein the door frame is formed from plate steel.

70. The training door of claim 39, wherein the door frame is configured for modular attachment to a shoot house.

71. The training door of claim 70, wherein the outer edge of the door frame is plate steel, and wherein the frame is attachable to a shoot house by placement adjacent a steel panel of the shoot house so as to form a joint and by securing the joint with a facing strip, backing means, and bolts.

72. The training door of claim 39, comprising a frame latch bracket disposed on the door frame and a door latch bracket disposed on the door, wherein the door is secured by connecting the door latch bracket and frame latch bracket with a breakable connector.

73. The training door of claim 72, wherein the breakable connector is selected from the group consisting of bolts, dowels, wire, plastic rods, plastic, cable ties, and wire ties.

\* \* \* \* \*